United States Patent [19]
Perry

[11] Patent Number: 5,388,773
[45] Date of Patent: Feb. 14, 1995

[54] CRUSHED FLUORESCENT TUBE PARTICULATE SEPARATION AND RECOVERY METHOD AND APPARATUS

[76] Inventor: Timothy J. Perry, 1875 Piedras Cir., Danville, Calif. 94526

[21] Appl. No.: 33,637

[22] Filed: Mar. 16, 1993

Related U.S. Application Data

[63] Continuation-in-part of Ser. No. 731,766, Jul. 17, 1991, abandoned.

[51] Int. Cl.⁶ ............................................. B02C 19/12
[52] U.S. Cl. ..................................... 241/19; 241/24; 241/57; 241/60; 241/99; 241/101.8
[58] Field of Search ................... 241/99, 101.8, 19, 24, 241/57, 60, 18

[56] References Cited
U.S. PATENT DOCUMENTS
2,910,508 10/1975 Stauffer et al. .................. 241/60 X FOREIGN PATENT DOCUMENTS
248198 12/1987 European Pat. Off. .
3610355 10/1987 Germany .
61-219736 9/1986 Japan .

Primary Examiner—Mark Rosenbaum
Assistant Examiner—Frances Han
Attorney, Agent, or Firm—Charles A. Wilkinson

[57] ABSTRACT

The separation of potentially toxic phosphor compounds from fractured glass particulates derived from crushing used fluorescent light tubes is improved by continuously mixing the fractured glass particulates together in surface contact with each other to abrade the toxic phosphors from the surfaces of the glass particulates followed by separation by air stripping of the small phosphor particles from the fractured glass particulates. The stripping usually is done in a separate stripping chamber. The mixing and abrading may be accomplished in a variety of mixing devices including auger-type apparatus, rotary chambers, fluosolids reactors and others.

28 Claims, 6 Drawing Sheets

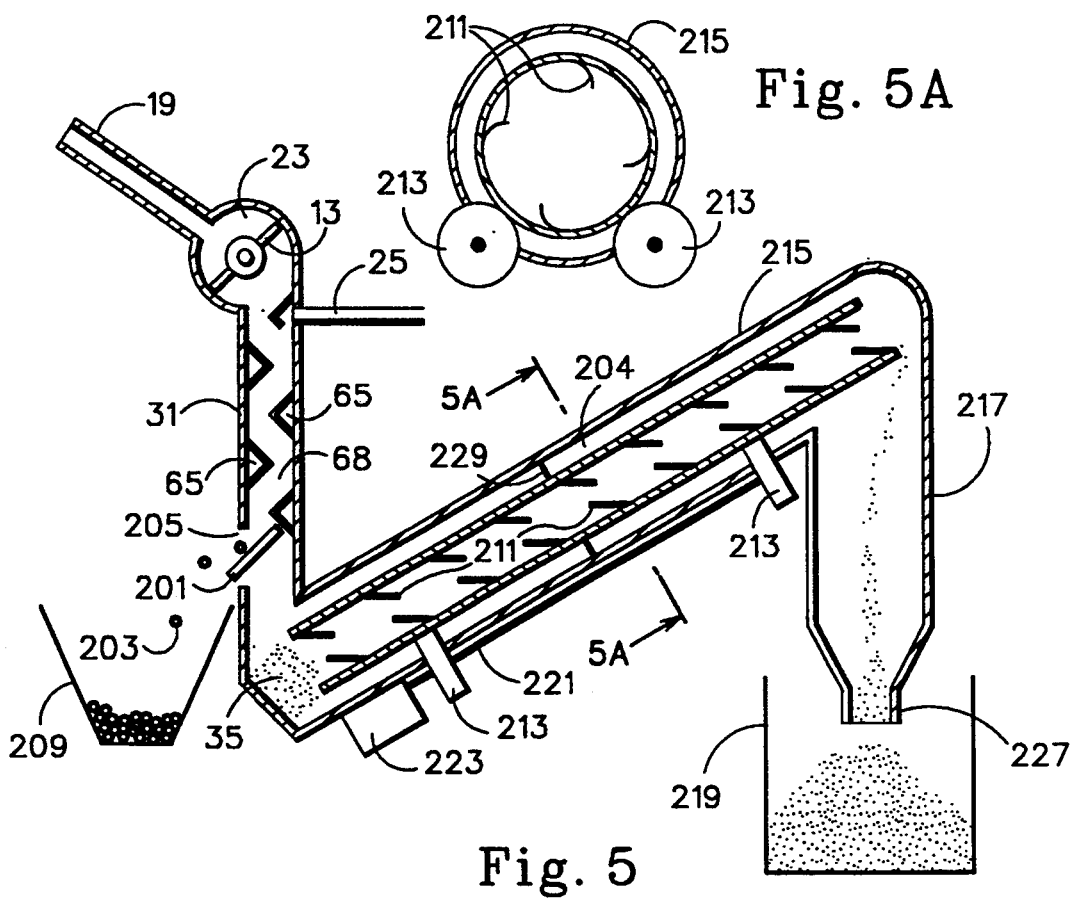
Fig. 5A
Fig. 5
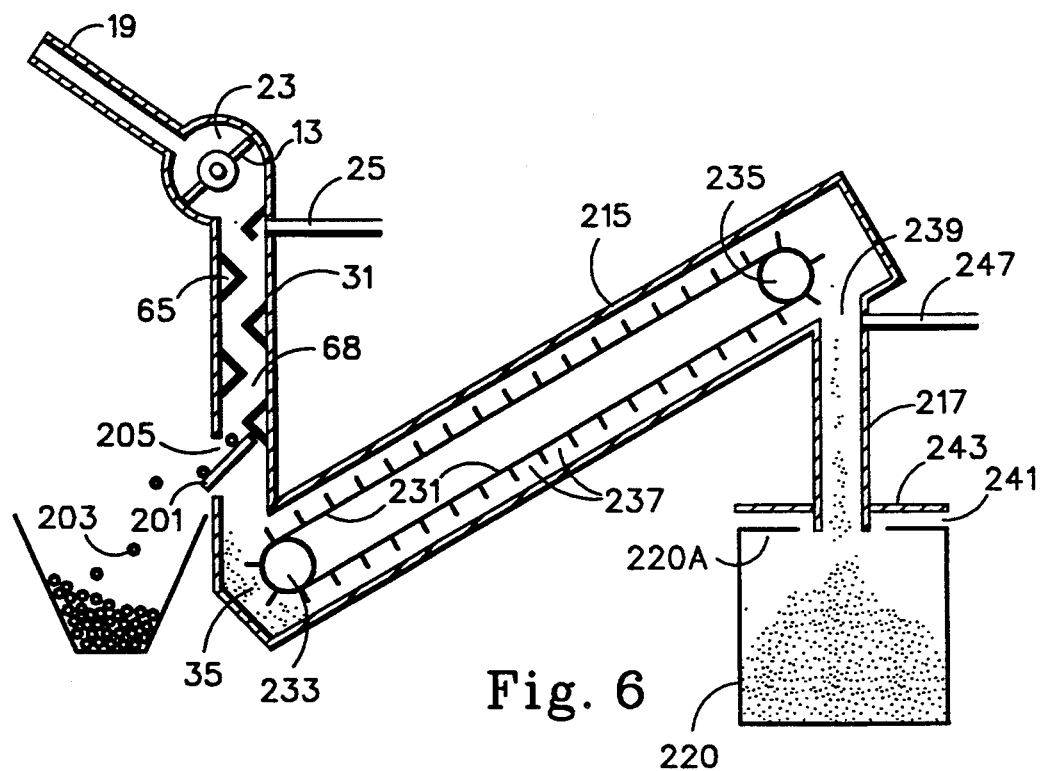
Fig. 6

CRUSHED FLUORESCENT TUBE PARTICULATE SEPARATION AND RECOVERY METHOD AND APPARATUS

RELATED APPLICATIONS

This application is a continuation-in-part of the U.S. application Ser. No. 07/731,766 filed Jul. 17, 1991, now abandoned.

BACKGROUND OF THE INVENTION (1) Field of the Invention

The present invention relates to the recycling or digestion of used fluorescent tubes. More particularly, the present invention relates to a combined crushing and separation system in which a clean separation is made between the crushed glass and the potentially toxic fumes and powders contained within the interior of fluorescent tubes. More particularly still, the present invention relates to agitation and abrasion of the glass particulates derived from used or burned out fluorescent tubes after fracturing such tubes by a prior fracturing apparatus to effect a superior separation of powder material adhering to the already fractured glass particulates derived from such sections of burned out tubes.

(2) Discussion of the Prior Art

Fluorescent light tubes are formed from elongated cylindrical or tubular glass receptacles which are charged with mercury or other conductive vapors. The inside surface of the tube is coated with a fluorescent coating of some form such as phosphorus itself or other phosphor powders such as antimony, beryllium, cadmium and strontium compounds plus in some cases lead and the like. Mercury vapor as well as beryllium, strontium, lead and cadmium are well known as potentially toxic materials as are other phosphor powders with which the inside of a fluorescent tube may be coated. Older fluorescent tubes often used fairly high concentrations of beryllium powders, but this has been, in general, superseded in more recent fluorescent tubes by cadmium-type powders.

Since fluorescent tubes are in general, bulky and unsatisfactory for disposal without treatment, it has become customary to crush them into small pieces by various means and then dispose of the fractured pieces. Merely fracturing the tube itself into small pieces for disposal, however, is not very satisfactory because of the potentially toxic nature of the dust and vapor originally confined inside the fluorescent tube. Such potentially toxic particulates, which occur mostly in the form of small dust particles plus mercury vapor and small drops or beads of mercury, can be quite detrimental if they escape to the environment.

While it might be possible to refurbish burned out fluorescent tubes by removing the metal ends or "tips" from the tubular glass envelope and cleaning the inside followed by recoating the inside of the tube with fluorescent or phosphor powder material, followed by the addition of new tips and recharging with conductive metallic vapor, as a practical matter, the cylindrical glass container itself has little intrinsic value. Furthermore, it is difficult to properly renew the internal fluorescent surface of the tube and difficult to reapply the metallic tips to form an effective seal with the ends of the tube. It is usually more economical, therefore, to manufacture new fluorescent tubes than to refurbish worn out tubes. It has consequently become customary to dispose of the used tubes. However, because of their bulky nature, it is difficult to adequately dispose of the tubes except by crushing to reduce their bulk followed by disposal of the residue in a hazardous material landfill or dump site or the like. While it has been recognized the toxic particulates and vapors should be contained somehow, the usual manner of handling the toxic dust and vapor has been either to ignore it or to crush the tubular receptacle while washing by means of a flow or stream of water to prevent the escape of toxic material to the environment. Ignoring the toxic materials is no longer either acceptable or possible. Wetting down the crushed glass and other materials, on the other hand, creates what can only be referred to as a "soggy mess" which not only is difficult to dispose of, but weight-for-weight has become heavier and even more difficult to dispose of than the original dry material, particularly in view of its toxic nature.

It has long been known to provide apparatus for breaking or crushing glassware and particularly glass bottles and the like to reduce their bulk and incidentally to prevent their reuse particularly in the case of liquor bottles and the like. Among such apparatus may be mentioned the following patents described in the present Applicants' previous applications referred to above:

U.S. Pat. No. 2,185,352 to C. F. Peters
U.S. Pat. No. 2,558,255 to N. E. Johnson et al.
U.S. Pat. No. 3,353,756 to D. J. Morgenson
U.S. Pat. No. 3,655,138 to G. A. Luscombe
U.S. Pat. No. 3,889,886 to J. D. Spivey While it has been known, therefore, generally to crush glassware by mechanical crushing means in order to decrease its bulk prior to disposal, the crushing of glass bottles and the like and the crushing of glass receptacles containing hazardous materials such as fluorescent tubes and the like is something quite different. Hazardous materials such as the toxic phosphors coating the inside of fluorescent tubes or the mercury vapor trapped in the tube adds an entirely new dimension to the problem. A number of devices, machines and/or systems have been suggested or developed for the crushing of fluorescent tubes in order to decrease their bulk. Some of such devices are the following:

U.S. Pat. No. 2,593,657 issued Apr. 22, 1952 to A. J. Coon et al. discloses a reciprocating-type crusher designed to crush fluorescent tubes and the like. Coon et al. discloses that during crushing of the tubes the beryllium compound that adheres to the inner walls of the tube as a layer of dust has a tendency to become suspended in the surrounding air. Coon et al. attempts to alleviate this problem by providing an exhaust for air withdrawn from the treatment or fracturing zone and releasing such air "to the outer atmosphere whereupon it is safely dispersed into space". Coon et al. also discloses that he uses an airtight casing so there is as little escape of air and dust as possible until the air stream is discharged to the outer atmosphere. While Coon et al. uses an air stream to remove toxic materials from the tube fracturing zone of the machine, there is no evidence that Coon et al. recognized how to effect a reasonably clean separation between the toxic materials and the glass particles.

U.S. Pat. No. 2,620,988 issued Dec. 9, 1952 to E. H. Tellier discloses a fluorescent tube chopping device arranged for continuous flushing of the fracturing zone with a stream of water to flush the toxic materials from such fracturing zone. There is no separation between the potentially toxic dust and the crushed pieces of glass, both being collected in a lower removable receptacle. Because the potentially toxic materials are not removed from the glass particulates, the materials cannot be used again.

U.S. Pat. No. 2,628,036 issued Feb. 10, 1953 to J. B. Hall discloses a fluorescent lamp disposal arrangement in which fluorescent tubes are passed lengthwise down a tubular inlet at the bottom of which the fluorescent tubes are progressively fractured into pieces by a rotating hammer arrangement. A large suction fan is arranged at the top or upper end of the system and a water inlet is arranged just above the chopper blades. During operation of the device, therefore, there is a countercurrent flow of material through the apparatus with fractured tube material traveling downwardly together with flushing water or other material and the air stream passing upwardly to draw out gases. The fractured glass and metal may be separated from the water containing the toxic beryllium powder by means of a screening arrangement down which the water and fractured glass material pass and the metal tips derived from the tubes separated from the fractured glass by magnetic means. The air stream does not pass between the fractured glass particulates, but merely over them.

U.S. Pat. No. 2,866,604 issued Dec. 30, 1958 to J. B. Hall discloses a fluorescent tube disposal device including a rotary breaker arm disposal arrangement bathed in water during actual breaking of the fluorescent tubes. Hall uses a magazine to contain the fluorescent tubes and provides for a draft of air to be drawn through the magazine during use.

U.S. Pat. No. 3,913,849 issued Oct. 21, 1975 to I. M. Atanasoff et al. discloses a fluorescent tube digester or breaker. The Atanasoff et al. device is made to fit on the top of a barrel and to draw air downwardly through the chamber and out the usual bung hole where there is provided a surface filter arrangement to remove phosphorus and mercury from the air stream.

U.S. Pat. No. 4,545,540 issued Oct. 8, 1985 to A. Nakamura discloses a device for breaking up fluorescent tubes within a large open casing. The fractured particulates fall straight down and are collected in the bottom of the apparatus while an air stream is drawn off from the side to remove environmentally harmful substances namely toxic dust and powder particulates. Little attempt appears to be made to effect a separation between the toxic particulates and the glass. A vacuum stripping system is used. However, the principle aim appears to be to draw off gaseous and other contaminants and separate them from the air stream in order to prevent injurious substances from leaking from the apparatus and contaminating the environment.

U.S. Pat. No. 4,579,287 issued Apr. 1, 1986 to W. E. Brown discloses a chain flail-type tube crusher for fluorescent tubes. The crushing or breaking occurs in a closed barrel-type environment and the debris is deposited into a plastic bag-type liner without any attempt to separate the glass components from toxic dust or powder components or even to draw off harmful mercury vapors.

U.S. Pat. No. 4,607,798 issued Aug. 26, 1986 to K. F. Odlin discloses a lamp crushing apparatus having a special non-jamming crushing blade which is bathed in water sprays during operation to remove or absorb toxic materials. A forced draft of air also appears in one embodiment to circulate past the rotating blade from the side. The air drawn off is not filtered, but the wash water is filtered as it runs off. The Odlin device crushes not only fluorescent tubes, but also sodium lamps and the like.

U.S. Pat. No. 4,655,404 issued Apr. 7, 1987 to J. W. Deklerow discloses a portable flail-type fluorescent tube crusher for breaking fluorescent tubes. The device includes a filter system making use of an exhaust fan for generating a vacuum in the crusher housing to draw off toxic gases including mercury and pass them into a treated charcoal filter to absorb the mercury vapors.

While the prior devices noted above have enjoyed at least a modicum of success, serious problems and inconveniences have persisted. In particular, the separation between the toxic materials and the supporting and confining materials has not been sufficient to allow such supporting and confining materials, i.e. essentially the glass, to be disposed of or reused without special precautions because of hazardous inclusions. Furthermore, the toxic material, i.e. the mercury, antimony, beryllium, cadmium, strontium and other fluorescent materials, as well as other materials such as lead and the like originally contained within the tubes, have not been separated sufficiently from the supporting and confining materials, i.e. the glass, to allow either handling in a relatively constricted volume and/or any sort of reasonably effective partial or complete recovery. The most successful systems, furthermore, have incorporated a washing step. Washing, however, creates a large volume of polluted water which must then be dealt with in turn and in addition, creates wet, heavy and often sticky materials that are inherently difficult to handle and/or dispose of. There has been, consequently, a definite need for a method and means that is economical, convenient and effective in treating or digesting used fluorescent tubes and that makes an effective separation of the toxic materials from the supporting and confining materials by a dry separation process and means.

U.S. Pat. Nos. 5,042,724 and 5,092,527 issued respectively on Aug. 27, 1991 to T. Perry, the present inventor and Mar. 3, 1992 to T. Perry et al. disclose the fracturing of used fluorescent tubes into small pieces followed by countercurrent stripping of the fractured glass particulates with a stream of air as well as jarring of the glass particulates as they pass through the countercurrent stripping zone. The apparatus and methods of these patents have considerably improved the efficiency and effectiveness of the treatment and recovery of the components of used fluorescent light tubes. However, it has been recognized that there remains still further room for improvement. While the separation between toxic materials and fractured structural materials, i.e. glass particulates, is very effective in the invention described in the Applicant's prior patents, a complete or 100% separation has not been found possible. Consequently, there is a need for a redundant or further improved separation of the glass particulates and the objectionable powder and vapor-type materials originally included with them.

OBJECTS OF THE INVENTION

It is an object of the present invention, therefore, to provide an apparatus for treating used fluorescent tubes that more effectively separates the toxic materials from the supporting and confining materials by a dry method.

It is a further object of the invention to provide a method and means for treating used fluorescent tubes to reduce the tube material to a minimum volume while effectively separating toxic materials from the glass tube material by passing crushed tube material through an auger-type mixing and agitating apparatus to improve separation of toxic powder from such particulates by an air stream and gravitationally-induced settling.

It is a still further object of the invention to provide a method and means for separating the toxic materials from the structural material of a fluorescent tube by an air separation method involving active forced movement of adjacent particulates past each other while maintained in physical contact with each other and while exposing them preferably to an accelerated countercurrent stripping gas stream.

It is a still further object of the invention to provide a method and means for separating toxic materials from the structural material of a fluorescent tube by means of an auger-type transport means that in effect abrades adjacent particulates against each other effectively dislodging toxic material from their surfaces by physical abrasion and attrition while at the same time removing the toxic material with a very rapid gas stream.

It is a still further object of the invention to make an effectively clean separation by a dry method of the toxic materials in used fluorescent tubes more efficient by impacting particles of the fractured fluorescent tubes with each other through physical force applied by a general mixing action applied by a suitable apparatus.

It is a still further object of the invention to make an effectively clean separation by a dry method of the toxic materials in used fluorescent tubes more efficient by passing crushed fluorescent tube material through a mulling or mixing action effected by passing said particulates through an auger-type system.

It is a still further object of the invention to make an effectively clean separation by a dry method of toxic materials used in fluorescent light tubes by actively abrading the individual glass particulates derived from fracturing the glass envelope of such tubes together by passing such particles through a mixing apparatus such as a rotary mixer, a fluosolids mixer or other relative movement mixer followed by countercurrent air separation.

It is a still further object of the invention to make an effectively clean separation by a dry method of toxic materials used in fluorescent light tubes by abrading the individual glass particulates derived from fracturing the glass envelope of such tubes together in a rotary auger-type apparatus wherein the rotary auger is relatively smaller than its housing providing a space between the auger and the housing for a layer of glass which decreases wear of the housing.

It is a still further object of the invention to friction mix glass particulates from fractured fluorescent tubes by passing said particulates continuously together by passing them through a rotating hollow cylinder having inclined internal blades which move said particulates through said cylinder from one end to the other while periodically dropping the particulates through an air stream passing through the hollow cylinder to carry off small particles of toxic powder abraded from the surface of said particles.

Other objects and advantages of the invention will become evident from reference to the accompanying drawings and description.

BRIEF DESCRIPTION OF THE INVENTION

It has been found by the present inventor that an improved separation can be made between the toxic powder coating the inside of fluorescent tubes and the glass material which is coated, if after the active fracturing of the glass into restricted sized pieces, the fractured glass particulates are passed in contact with each other through an apparatus which continuously moves the particles forcefully against each other after which the particulates can be separated from the powder in any suitable manner such as by being exposed to the action of a rapid air stream or to physical separation through gravitational effects or by relative mass separation. In a preferred arrangement, the particulates are passed through an auger-type transporting and mixing apparatus. Preferably also, the toxic dust is entrained in a very rapid flow of gas across the surface of the fractured pieces of the glass as they are exposed to the air. Countercurrent flow of the entrainment gas with respect to the fractured glass particulates is preferably provided during at least the terminal portion of the passage of the glass through the auger apparatus or immediately subsequent thereto. The apparatus and method of the invention is preferably combined with a preliminary countercurrent stripping of toxic powder from the surfaces of the glass particulates after fracturing and most preferably after impacting the glass particulates in a serial fashion with jarring means to aid in dislodging toxic dust and powder from the surface of the fractured glass particulates. Other types of mixing apparatus can be used, some of which inherently combine simultaneous air stream separation of the toxic powders from the glass particulates.

BRIEF DESCRIPTION OF THE DRAWINGS

FIG. 3A is a cross section of the auger and housing at Section 3A in FIG. 3.

FIG. 5 is a partially broken away diagrammatic illustration of a very desirable embodiment of the invention involving the use of rotating cylinder-type mixing and abrading apparatus in combination with a filtering and absorption apparatus not shown.

FIG. 5A is a cross section of FIG. 5 at Section 5A.

FIG. 6 is a partially broken away diagrammatic illustration of a further alternative embodiment of the invention involving the use of a traveling scraper-type mixing and abrading apparatus.

DESCRIPTION OF THE PREFERRED EMBODIMENTS

Figures 1, 1A:
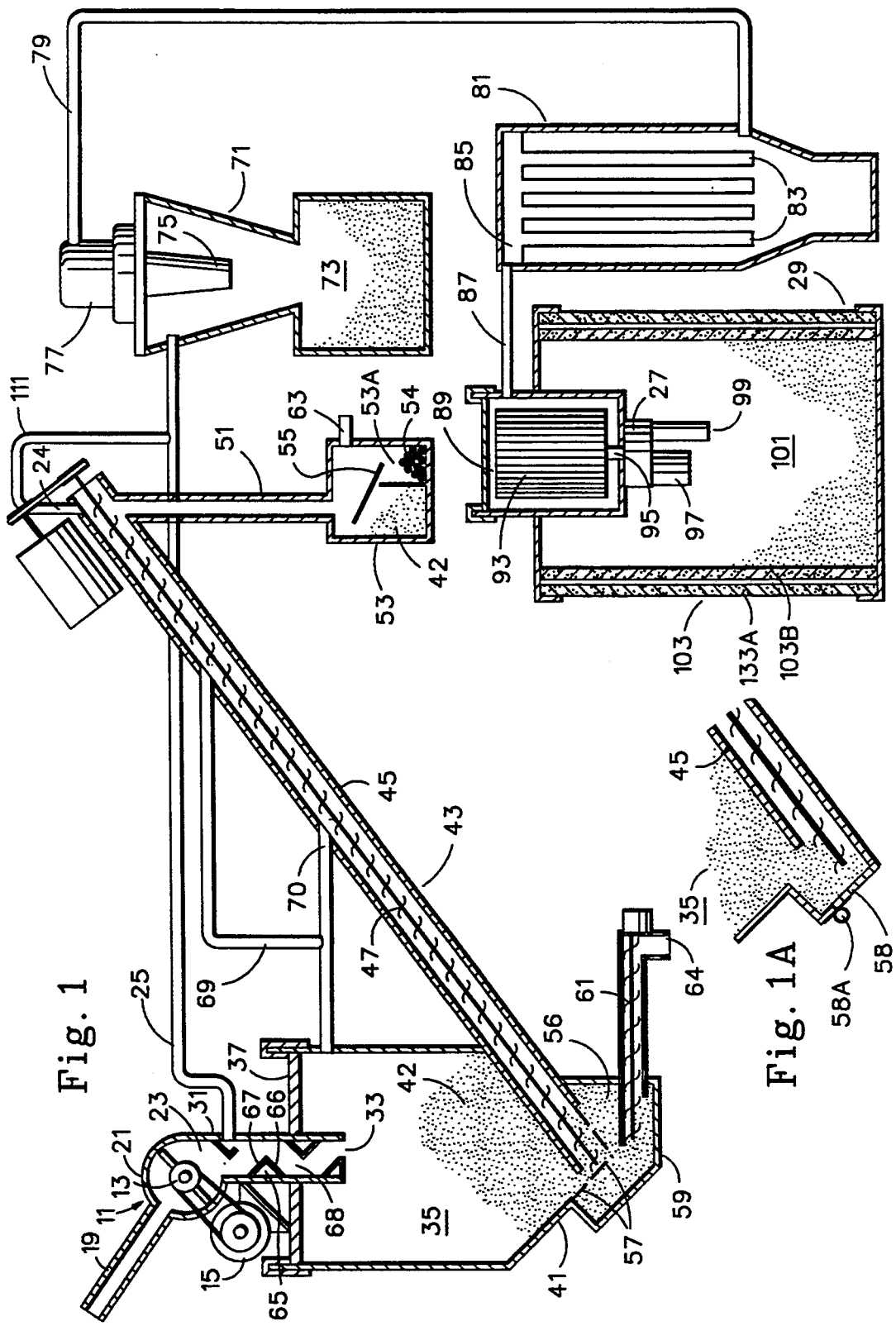
FIG. 1 is an overall partially broken away diagrammatic side view of a preferred embodiment of the apparatus of the invention involving the use of an inclined mixing and abrasion auger in combination with a filtering and absorption arrangement for removing the toxic remainder products from a stripping gas.
FIG. 1A is a partial view of an alternative arrangement of the lower portion of the collection chamber shown at the bottom left of FIG. 1.

As indicated above, the present invention has provided a very efficient fluorescent tube crushing and recovery apparatus which effects a very complete dry separation between fractured glass particulates and the potentially toxic particles or dust coating the inside of the original glass envelope of a fluorescent tube plus the metallic vapor within the tube. The application of the present inventor and his co-inventor entitled "Fluorescent Tube Crusher with Particulate Separation and Recovery", issued Mar. 3, 1992 as U.S. Pat. No. 5,092,527 discloses a fluorescent tube crushing apparatus that establishes an accelerated flow of gas through a two-part fracture and separating zone. The first portion of such zone is a fracture zone where fluorescent tubes are fractured by a rotating blade journaled rather snugly in a casing through which air or other gas is passed at a fairly rapid rate to maintain a rapid flow of gas through the chamber within the casing at all times in a downwardly direction or broadly in the direction in which the glass particulates are directed when the tubes are shattered. The flow of air or other gas is at least generally concurrent with the direction of passage of the fractured glass particulates through and from such chamber.

Immediately below the fracture chamber is positioned a countercurrent flow, gas stripping chamber through which the fractured glass particulates fall after leaving the fracture chamber. The countercurrent flow stripping chamber is supplied with a rapid flow of a dust or powder stripping gas such as air which travels generally upwardly countercurrently to the glass particulates stripping away any loose powder from the surface of the glass particulates. A gas offtake is provided between the fracture chamber and the countercurrent flow chamber. Both the gas passing downwardly through the stripping chamber and the stripping gas passing upwardly through the countercurrent stripping chamber is removed through such offtake. This arrangement enables the downwardly flowing gas in the fracture chamber to not only keep the chamber clear of accumulated dust and powder deposits, but to immediately entrain powder shaken or jarred from the surface of the fractured glass particulates, which entrained powder is removed from the vicinity of the surface of the glass particulates. This entrained powder is then, as the glass particulates fall through the the up-welling clean gas rising through the countercurrent stripping chamber, quickly removed from the vicinity of the glass particulates and conveyed from the chamber through the offtake. Such sudden separation is believed to prevent clumping or sticking of the powder to the glass particulates by electrostatic or other influences. Meanwhile, the glass particulates fall through the rapidly upwardly flowing stripping gas which further strips any loose powder from the surfaces of the glass particulates and carries such powder upwardly and out the outlet or offtake from the powder.

The flow of gas through the fracture chamber should be sufficiently rapid to prevent buildup of powder deposits in the fracture chamber and also to prevent backflow of any gas from the chamber as the flow pulsates due to consecutive passage of fluorescent tubes down the feed tube and also due to occasional possible implosion of fluorescent tubes as they are struck by the fracture blade. The flow of stripping gas, on the other hand, must be sufficiently accelerated to carry all dust and powder upwardly and to strip loose powder from the surface of falling glass particulates, but not so accelerated as to carry glass particulates, or at least large glass particulates, upwardly with the gas.

While the inventions which are the subject of the prior filed applications, upon which the present invention is an improvement, make a very effective separation of the glass particulates and toxic powder or dust originally coating the interior of the glass envelope constituting the containment envelope and the toxic powder of fluorescent tubes, such separation is still not always complete. Consequently, there is a need to improve the separation beyond the already very effective separation provided by such related inventions as well as to provide redundancy in the apparatus and method to allow for temporary disturbances which may otherwise lessen the usual efficiency of separation for short periods.

The present inventor has further found that the efficiency of separation of the toxic dust or powder from the glass particulates can be again very significantly increased by the provision, preferably just subsequent to the countercurrent stripping chamber, of a mechanical arrangement for forcefully contacting glass particulates derived from the fracturing chamber with each other and moving them past each other in an abrasive surface intercontact mode or manner. Forceful contact and movement past each other of the glass particulates abrades the surface of the glass particulates which tends to either immediately separate the outer powder particles from the glass particulate or at least to loosen such particulates upon the surface of the particulates and then to remove them. The abrasion treated material can then be further treated to physically separate the glass particulates from the toxic powders, preferably by use of a rapidly flowing air stream passing countercurrently with the glass particulates which will effectively separate the powder from such particulates. The impact or contact between the glass particulates plus the relative movement of the particulates past each other must be sufficient to tend to rub off or loosen at least some of the toxic powder adhering to the glass particulates, but not so great as to fracture the particulates, since if the particulates are broken into too small sizes, the force of the countercurrent air will carry the glass particulates upwardly with the powder material, thus defeating the desired separation. Essentially the same considerations apply with respect to other methods of separating the glass and the powder from each other after they have been physically detached from each other.

The preferred and probably one of the simplest and most effective arrangements for physically abrading the surfaces of glass particulates by forcing them to move past each other in forceful contact is by means of an auger into one end of which the fractured glass particulates are fed and from the other end of which the particulates and detached powder is fed to a separation arrangement. The separation arrangement will be preferably a countercurrent flow of air past the glass particulates which are preferably arranged to pass downwardly by gravitational action through the ascending countercurrent stripping air. Other arrangements are also possible, including sifting and screening including vibratory screening, fluosolids treatment arrangements and the like. The important thing, however, is to forcefully contact the fractured glass particulates with each other in a continuously changing pattern such as is attained in passage through a single auger or in almost any other sort of continuous mixing apparatus such as screws, augers, inclined paddles, revolving mixers of various types such as the ubiquitous cone mixer, mushroom mixers, tumbling barrel mixers, pug mills, ribbon blade mixers scraping-type mixers and the like, all of which can handle material in a dry state and tumble it against itself to abrade powder material from the surface of the fractured glass material without significantly further fracturing or grinding away the glass material itself. It has been found that the adherent powder on the surfaces of the fractured glass particulates can be very effectively, efficiently, and economically separated from the glass particulates by, as explained above, entering the material into an auger or inclined plane or screen-type apparatus which transports the fractured glass particulates upwardly to a predetermined height and then drops them from a height preferably through an ascending stream of air which carries away the light separated toxic powder, but does not deviate to any great extent the fractured glass particulates thereby effectively separating the toxic powder from the fractured glass particulates.

The countercurrent air or other stripping gas passing upwardly through the stripping chamber or space through which the material is dropped, should be relatively rapid so as to physically carry away all loose phosphor powder from the surface of the glass particulates and remove it from the vicinity of the glass particulates. Basically, the acceleration or, more correctly, the velocity of the gas through the stripping chamber should be at least in the neighborhood of 6000 feet/minute and may range up to 9000 feet/minute. A less desirable lower limit may be as little as 5000 feet/minute. The relative velocity with respect to the movement of the glass particulates is somewhat higher, since the particulates are actually falling through the gas, providing a relatively higher differential speed between the glass and the stripping gas. Stated in functional terms, the velocity of the stripping gas should be sufficient to carry away and separate substantially all loose powder removed from the surface of the descending glass particulates and to carry all loose powder upwardly away from the glass particulates into the gas offtake from the chamber allowing no loose powder to exit from the bottom of the stripping chamber, but not sufficient to carry the glass particulates upwardly. Preferably, the glass particulates should not be significantly retarded in their passage under the influence of gravity downwardly through the stripping chamber. This, of course, depends somewhat upon the size of the glass particulates. If the glass particulates become very small or powder-sized, they will be carried upwardly, particularly if the countercurrent stripping gas flow is very fast.

When the upwardly flowing stripping gas reaches the outlet from the chamber, it should also substantially entrain all the gas and entrained powder in the stream of gas passing from the chamber. As indicated, a velocity of stripping gas through the countercurrent stripping chamber of 6000 to 9000 feet per minute has been found to be very satisfactory, but the exact velocity may vary. The upper limit will somewhat depend upon the fracture size of the glass particulate as larger pieces of glass will fall through a higher velocity gas stream without being significantly retarded or carried away. The lower limit cannot be less than will effectively carry upwardly and away the phosphor powders removed or separated from the glass particulates.

The air stream exhausted from the fracturing zone and the countercurrent air flow zone as well as the air stream from the separation zone after the abrasion mixing operation is passed initially into a rough particulate separator that can be continuously cleaned or emptied, or at least has a large capacity between cleanings. A preferred separator may comprise a centrifugal or cyclone separator where the principal portion of the removed particulates are separated from the gas stream. The gas stream is then passed through a fine filter fabric or other fine filter which removes the residual dust particulates. The entire air stream is then passed through a chemically-coated activated carbon or charcoal-type filter where metallic vapor such as mercury vapor is removed from the gas. The air exiting from the activated carbon filter is completely particulate-free and has also been cleansed of metallic vapors.

FIG. 1 shows diagrammatically a side elevation of a partially broken away depiction of the fluorescent tube treatment apparatus of the invention. An initial fracturing and separating device or means 11 is provided with a rotating blade 13 powered by a motor 15. The rotating blade is positioned to rapidly strike the end of a fluorescent tube, not shown, that is extended or passed progressively down a feed chute 19. The rotating blade 13 is preferably rotated, as shown in FIG. 1, counterclockwise so that the tube or glass envelope 17 is struck downwardly, progressively breaking off small chunks of the tube which at the same time shatter into individual pieces of glass. These individual pieces of glass are thrown against the side of the chamber. The shock of both the initial fracturing and the later impact with the walls 21 of the fracture chamber 23, i.e. the upper portion containing the fracture blade 13 of the fracturing and separation device 11, causes the dust particulates coating the inside of the glass envelope to be jarred loose from the surface. These small dust particulates, which are normally adhered to the inside of the fluorescent tube by a suitable thin film of adhesive or other suitable expedients, after jarring loose become entrained in the air stream within the chamber, which air stream or flow passes initially down the feed chute 19 alongside the fluorescent tubes into such chamber and progresses through the fracture chamber 23 to the exhaust conduit or tube 25 which opens into the fracturing and separating device 11 just below the fracture chamber 23. A vacuum or suction is applied to the exhaust tube 25 from a suction or draft device farther down the line, in this case through a suction fan 27, as shown at the right side of FIG. 1, which fan 27 discharges air drawn through such fan with a forced draft directly into a massive activated carbon or charcoal-type filter 29 also shown in FIG. 1. Alternatively, the fan 27 could be positioned beyond the charcoal filter, particularly if it is desired to minimize escape of internal gas through any leaks in the charcoal filter housing or the like.

Below the fracturing chamber 23 of the fracturing and separating device 11 is positioned a countercurrent flow chamber 31 having a decreased diameter lower end through which air is sucked upwardly from the terminal opening 33 from a particulate collection chamber 35 which may comprise a steel hopper-type collector or any other type collector. A top or lid 37 closes off the upper portion of the hopper-type collector and in the embodiment shown also supports the fracturing and separating device 11 or means through the side walls 39 of the countercurrent flow chamber 31.

Within the countercurrent flow chamber 31 in FIG. 1, there are provided a series of baffles or jarring surfaces 65 shown extended from the side wall of the countercurrent flow chamber 31. These baffles 65 are provided with generally upwardly directed slanted impact surfaces 67 onto which the glass particulates drop or are initially projected by the rotating blades 13 and then bounce from the first to the second of such surfaces. Opposite impact surfaces 67 of the baffles 65 are opposed surfaces 66 which define between them a tortuous passage 68. Each impact of a fractured glass particulate with the impact surfaces 67 has been found to dislodge additional powder and any other contaminants from the surfaces of the fractured glass particulates and to significantly increase the separation between the glass and the toxic powder particles. Between impact surfaces, the glass particulates pass downwardly through the countercurrent flow of stripping gas which removes dislodged toxic particles and other particulates from the immediate vicinity of the glass particulates and carries them upwardly into the suction or outlet tube 25.

The fractured or broken glass particulates, after being fractured in the fracture chamber 23, fall through the countercurrent flow chamber 31 and through the terminal orifice 33 into the collection chamber 35. During their passage, essentially in a free fall straight downwardly through the countercurrent flow chamber 31, they are acted upon by upwardly flowing gases or air passing through the terminal orifice 33 from the collection chamber 35 into and through the countercurrent flow chamber 31 and into the vacuum or suction conduit 25. As these upwardly moving gases pass the downwardly falling glass particulates, passing through the countercurrent flow chamber, they strip residual toxic dust precipitates from the surface of the glass particulates and carry them upwardly to the inlet of the suction tube 25 through which such powders and gases are exhausted to subsequent filter apparatus to be described. The velocity of the upwardly flowing gas through the countercurrent flow chamber 31 may desirably be about 7200 feet per minute. Less desirably, the gas velocity may be about 6000 to 9000 feet per minute. In all cases, the velocity of the gas passing upwardly through the countercurrent flow chamber 31 should be sufficient to strip away any loose powder adhering to the glass particulates and carry it upwardly to and out the exhaust conduit 25, but insufficient to carry upwardly any significant quantity of glass particulates. In other words, the upwardly flowing gas stream can be characterized as having a differential separation velocity as between powder originally coating the inner surface of the fluorescent tube and fractured glass particulates.

As will be understood, the glass particulates are, in the embodiment of the invention shown in FIG. 1, interrupted in their fall through the countercurrent flow chamber by impacting upon the impact surfaces 67 of the baffles 65. The first such interruption is at the top of the countercurrent flow chamber 31 just after the glass particulates exit from the fracture chamber 23. At this point, many of the particulates are still traveling with residual velocity obtained from impact with the fracture blade 13. The second interruption is just below the first impact surface after the particulates are deflected to the next impact surface and the fourth and last interruption is at the bottom of the countercurrent chamber where the glass particulates strike the last baffle 65 just prior to leaving the tortuous passage 68 via the exit orifice 33 after having bounced from one impact surface 67 to the next, down through the countercurrent stripping chamber. Impact of the glass particulates with the impact surfaces 67 leads to vibration of the glass particulates and this vibration, as well as the original shock of impact, tends to crack off or loosen powder from the surfaces of such particulates, which powder is then stripped from the surface by the rapid countercurrent flow air stream.

It will be seen in FIG. 1 that the descending gas or air passing through the fracturing chamber 23, the passage of which gas is substantially aided by the counterclockwise rotation of the fracture blade 13, meets the upwardly passing gas or air flowing through the countercurrent flow chamber at the outlet to the suction conduit 25 and both air or gas streams there merge and pass into the conduit 25. In this manner, the falling glass particulates rather suddenly meet the upwelling body of relatively clean gas in the countercurrent flow chamber 31 and the surrounding dust particulates are very effectively and quickly stripped away from the glass particulates which pass quickly through the interface between the two air streams and continue downwardly through the upwardly passing clean stripping gas.

The area at the bottom of the fracture chamber 23 where the two streams of air or other gas meet, is an area of tumultuous turbulence, due not only to the meeting of the two streams of gas, but also due to the rotation of the fracturing blades and the rapid passage of heavier glass particulates through such area of turbulence. The turbulence of the area particularly just before the glass particulates descend quickly through the interface between the two air streams is believed to aid separation of the powder from the fractured glass particulates. Fairly sudden removal of the major portion of the dust or powder particulates from the vicinity of the glass particulates as the glass particulates pass through the interface between the two air streams and meet the upwelling flow of countercurrent stripping gas is also believed to be beneficial in avoiding reuniting of the powder particulates and glass by electrostatic effects and the like. Since there should be considerably more stripping gas passing upwardly through the stripping chamber 31 than gas passing downwardly through the fracture chamber 23, the large amount of stripping gas rather easily merges with, and in effect, entrains the gas passing from the fracture chamber and carries it into the outlet or suction conduit 25.

As will be seen from the drawing in FIG. 1, it is physically impossible for the glass particulates to progress in a straight line through the passage 68 so that the glass particulates must, in effect, drop from one surface to the next, each time jarring and shaking the particulates and causing dislodgment of toxic powder from the surface of the glass particulates. This toxic powder is then caught up in the countercurrent air or other gas flow and carried upwardly through the tortuous passage 68 and into the take-off 25 which is positioned just below and partially in back of the upper jarring step or baffle 65c. The distance of the jarring surfaces from each other should be sufficient to allow sufficient acceleration of the glass particulates as they fall from jarring surface to jarring surface to dislodge powder from the surface of the glass particulates, but insufficient to cause additional fracturing of the glass. It is undesirable for the glass particulates to be broken into too small particles else they may also be entrained in the countercurrent gas stream and removed with the toxic powder rather than with the larger glass particulates.

The fractured glass particulates, after having passed through the tortuous passage 68 bouncing from one impact surface to the next, finally pass through the opening 33 at the bottom of the tortuous passage and fall into the particulate collection chamber 35. Such particulate collection chamber 35 has a substantially conical or slanted bottom 41 against which the fractured glass particulates 42 collect. Extending into such bottom from one side at an angle is an auger-type screw conveyor or mixer 43 having an outer casing 45 and an inner auger 47. The casing 45 is open at the bottom and the auger extends partially from such casing into the mound of fractured glass particulates that has collected upon the bottom 41 of the collection chamber 35. As the auger or spiral screw conveyor turns, the fractured glass particulates are drawn into the spiral conveyor, and as the conveyor rotates, such particulates are carried upwardly in the conveyor. Since the auger is continuously turning and forcing the fractured particulates upwardly, there is a considerable continuous agitation of the particulates with a continuous overturning of the particulates collected within each spiral of the auger with the result that the various particulates are rubbed continuously against each other abrading toxic powder on the original surfaces from such surfaces. Such loosened or freed toxic powder particulates being considerably smaller than the fractured glass particulates tend, due to the general agitation of the column of glass particulates in the auger, to work their way back down the auger while the glass particulates are carried upwardly and discharged at the top down the discharge chute 51 into a collection chamber 53 where the glass particulates may pass through a screen or more preferably, a grizzly 55 which separates out the larger tips or metal electrodes from the ends of the tubes which electrodes are deposited in the separate section 53A of the collection chamber.

The toxic powder material 56, which works its way back down the rotary auger, collects at the bottom and may be allowed to pass through small openings 57, too small for the passage of fractured glass particulates, in the bottom into a storage chamber 59 below the collection chamber 35. A helical screw-type transporter 61 extends into the storage chamber and may be used to remove the toxic powder for disposal or recovery. Such removal may be either continuous or periodic as necessary.

Alternatively, it has been found that since not a great deal of toxic powder collects at the bottom of the rotary screw auger 47, that such powder may merely be allowed to build up or collect at the bottom of the auger 47 and may be merely cleaned out during down time of the apparatus by a vacuum hose or even manual shoveling through a trap or opening in the side of the bottom of the collection chamber 35 or bottom of the auger casing 45. In such case, the bottom portion of the collection chamber with the helical auger extending into it may appear substantially as shown in FIG. 1A. A clean out trap 58 is provided just opposite the lower end of the auger 47. Preferably the trap door 58 is hinged at the top 58A.

Even where the arrangement shown in FIG. 1 at the bottom of the auger mixer is used with the auxiliary powder extraction auger 61, since the very small powder openings 57 may well become periodically occluded by fractured glass particulates or the like, it may be desirable to provide clean-out traps and the like, not shown, for periodic vacuuming out or other removal of the excess accumulations of toxic powder.

While a large percentage of the toxic powder, because of its small size, works its way back down the helical screw conveyor 47 because of its relatively small size and reaches storage chamber 59, some of the toxic powder is also carried up the auger 43 with the fractured glass particulates and is discharged down discharge chute 51 with the fractured glass particulates. This toxic powder, after having passed through the abrasion device, i.e. the rotary auger 43, will have been largely abraded, however, from the surface of the fractured glass particulates.

As a result of an air inlet 63 in the side of the collection chamber 53 and interconnections 70 and 69 between the upper portions of the auger 43 and the particulate collection chamber 35, as well as a separate air or gas take-off conduit 111 at the top of the auger 43 connecting with the main stripping gas conduit 25, air is drawn rapidly up the discharge chute 51 countercurrent with the descending fractured glass material and small particles of toxic powder which, as a result of abrasion between the fractured glass particulates, have all been effectively removed from the surface of the fractured glass particulates. The air passage up the conduit 51 is sufficiently fast to carry all loose powder up the chute 51 and into the top of the auger casing 45 where, because it is already entrained in the rapidly moving air, such as powder, is withdrawn with the air stream passing through the conduit 111 via off-take conduit 24 from the auger casing 45 into a centrifugal separator 71 via the main stripping gas conduit 25 and also to some extent via conduits 70 and 69 into the collection chamber 35 where it eventually joins the countercurrent flow of air upwardly through the tortuous passage 68. This countercurrent stream of air, as explained above, joins the concurrent stream of air passing down the chute 19 and through the fracture chamber 23 and is drawn off through the off-take conduit 25.

Two streams of gas or air pass into the initial portion of conduit 25, the one from the top being fairly well saturated with small particulates separated from the fractured glass particulates in the fracture chamber 23 and the one from the bottom issuing from the tortuous passage 68 being much cleaner countercurrent stripping gas. However, the gas stream from tortuous passage 68 also carries, by the time it has traversed passage 68, considerable toxic powder. This toxic dust carrying air passing into the exhaust or off-take conduit 25, located just under the upper baffle 65, joins air passing from conduit 111 and then passes from conduit 25 to a cyclone-type gas separator 71 where a swirling motion is set up in the air stream by the angle of the gas entering from the side. Such swirling motion combined with the increase in the volume of the passage, as generally known to those skilled in the art, causes the upper range of the small particulates entrained in the gas to move outwardly in the gas stream and to separate from the gas stream against the side of the cyclone apparatus and fall along the side wall to the bottom of the cyclone separator where the particulates can be periodically allowed to pass by gravity from the bottom of the cyclone into any suitable receptacle, not shown.

The gas from which the particulates have separated largely by having been thrown against the sides of the cyclone chamber 73 by the spiraling action of the gas, meanwhile fills the center of the chamber and wells or passes upwardly from the chamber through a central dependent conduit 75, the shape of the outer surfaces of which serves initially also to aid in initiating the swirling motion of the gas passing into the cyclone device. The upwelling gas passes through the conduit 75 into an upper chamber 77 from which it is exhausted through a further conduit 79 into the lower portion of a baghouse-type filter 81 where the air stream is filtered by conventional periodically vibrated filter bags 83. The filter bags effect a good separation between the air and toxic powder entrained in the air. The filter air is collected in the top of the bag-house-type filter 81 into the chamber 85 from whence it is discharged via conduit 87 to the top of a filter chamber 89. Within the top of the filter chamber 89 there is preferably a high efficiency HEPA-type filter 93 for removing very fine particulates from the air stream. The HEPA filter 93 is provided with an outlet 95 which leads from the filter chamber 89 to the suction fan 27 previously identified. This fan 27 is operated or rotated by a motor 97 and exhausts from an outlet 99 which opens into the approximate center of the activated carbon or charcoal filter 29 previously identified. The previously filed patents referred to above show the use of an additional cloth bag-type filter in the top of chamber 89 and a shielding cloth filter about the HEPA filter. However, it has been found that with the improved apparatus, such additional filter bags are no longer required, although they could be used, if desired.

The activated carbon or charcoal filter 29 is shown formed of a central chamber 101 within the center of a series of flat activated carbon panels 103 usually two or more inches thick. Each panel is preferably formed of two separate panels a short distance apart designated 103A and 103B. The panels are fitted together so that an essentially gas tight chamber is formed having a fairly large central opening and outer walls formed of double carbon panels through which gas entering the central chamber and spreading out through the chamber slowly passes while metallic vapors such as mercury vapor in the gas are absorbed into the activated carbon. The large volume of the central chamber 101 and the large area of the activated carbon panels 103 surrounding the central chamber ensure that the gas velocity is slowed down sufficiently to allow sufficient retention time in the activated carbon panels 103 to absorb the metallic vapors in or upon the chemically coated activated carbon or charcoal. After the carbon panels are partially saturated with metallic vapor, the panels 103 are changed to renew the absorption capacity of the carbon filter panels.

As known to those skilled in the art, charcoal or activated carbon is a very efficient absorbent for metallic vapors such as mercury vapor and may also serve as an effective filter for very small particulates which become entrapped both on the surface and in the pores of the charcoal. Consequently, as the fan 27 exhausts the air or gas stream through the outlet 99, the mercury vapor from the interior of the fluorescent tubes is essentially carried through the entire system and finally exhausted from the outlet 99 into the center of the activated carbon or charcoal filter 29 from which the air percolates through the activated carbon or charcoal panels or filters 103A and 103B to the exterior while the mercury vapor is absorbed by the carbon or charcoal in the panels 103. As noted above, a very large area of charcoal or carbon filters is used. This allows very extensive percolation of the air or other gas through the charcoal or activated carbon filter and effective complete absorption of the mercury vapor in the discharge from the outlet 99 by the charcoal or activated carbon. The velocity of the gas through the filter should be adjusted to be in inverse ratio with the thickness of the carbon filter panels in order to allow absorption of all the mercury vapor.

It will be noted in addition that the air is forced into the activated carbon or charcoal by pressure rather than drawn through the charcoal by a negative or decreased pressure established on one side of the filter. Since the charcoal is rather dense and no substantial passages should be allowed in it, if complete mercury absorption is to be accomplished, it is more efficient for the air to be applied to the charcoal under a positive pressure rather than drawn through by atmospheric pressure working against a negative pressure. The large size of the filter, furthermore, makes it more convenient to apply a pressure gradient by forced air flow rather than by suctions against an atmospheric head. However, as noted above, difficulty may be encountered in a pressure system with leaks from the interior to the exterior. Consequently, for this reason alone, it may be desirable to provide a vacuum or suction-type system for passing air through the charcoal panels by enclosing the entire carbon filter system in a chamber. Alternatively, the carbon may be contained as a packing in a filter chamber through which air is drawn by suction.

As indicated at the beginning of this description, it is critical that a fairly large, but not inordinate volume of gas pass through the glass fracturing chamber 23 at a relatively high speed in order to strip the glass particles, while they are being fractured, of toxic dust particles originally adhered to the inner surface of the fluorescent tube and entrain such dust or powder particles. It is also important that countercurrent stripping gas be passed upwardly or countercurrently to the downward passage of fractured glass particulates as they pass from the fracturing zone. It has been found, as indicated above, that for best operation the gas should pass through the fracturing chamber at a rate of at least 50 to 70 feet per minute in the main fracturing zone of the fracture chamber with higher flows of gas such as 100 to 200 feet per minute or greater being desirable. Likewise, it has been found that the upward gas passage countercurrently with the descending glass particulates should preferably be at a rate of at least 7200 feet per minute in the most constricted portion of the countercurrent flow chamber. This rate of gas flow can only be attained if the passages themselves are fairly constricted and the large volume of gas can be pulled through the suction tubes 25, 79 and 87 by the suction created by the forced air fan 27. Consequently, in order to attain a consistently high flow of gas, it is important that the filter mechanism used not become easily clogged. This is accomplished by the overall arrangement shown in FIG. 1 and particularly by the use of the initial cyclone-type separator in the filter train.

It has been found technically desirable, and from a practical operating standpoint, necessary, to have a fairly loose fit of the auger 47 within the casing 45 of the helical transporter 43. This allows more chance for the small toxic powder particulates to work their way down the auger opposite to the larger fractured glass particulates which are carried upwardly by the helical screw of the auger. Even more important, however, it allows the establishment of a more or less permanent, or at least only slowly changing, layer of fractured glass particulate material upon the inner surface of the auger housing which, it has been discovered, prevents an otherwise unacceptable wear and deterioration of the housing which is very rapidly worn away by the hard glass material.

It has been found desirable also to form the auger housing as a U-shaped trough formed of a heavy metal section with an upper panel closing the top of the trough. This allows ready access to the spiral auger for maintenance and the like and a heavy section in which a glass coating may be packed to protect such trough from excessive wear over a period.

As indicated above, while the arrangement shown in FIG. 1 is the presently preferred commercial arrangement for the mixing and abrading apparatus for practicing the method of the invention, other arrangements are also possible. In fact, almost any forced mixing apparatus suitable for mixing or mulling the glass particulates together to such an extent that the surfaces are effectively abraded by intercontact, and whereby toxic powder is removed or forcibly wiped or abraded from such surfaces, will be found to be effective. For example, the material could be passed either batchwise or continuously through a rotating barrel-type mixer, preferably involving the use of mixing blades within such barrel or could be passed through a fluid solids-type apparatus in which the continuous churning of a dense mass of either air or other gas-supported particulates will fairly quickly abrade the toxic powder from the surfaces of the glass particulates. Other types of mixing apparatus in which the individual particulates are churned or agitated together, while separated by nothing more substantial than a gas such as atmospheric air, will be effective to abrade or wipe the toxic powder from the surface of the particulates after which the toxic powder can be separated from the glass particulates by a flow of separating gas.

While a number of physical contact mixing and abrading arrangements followed by air or other gas separation of the small toxic powder particles from the larger glass particulates will be found to be effective, the Applicant much prefers an arrangement in which the particulates are, at least to some extent, gravity compacted together as they are churned or agitated to maintain the particulates forcibly against each other as they are mixed by means of spiral or other blades, either continuous or discontinuous, which gradually move the materials along a predetermined path while forcibly churning or agitating them. This desirable arrangement is very effectively provided by a screw-type conveyor in which the particulates are essentially compacted together by gravity while being physically nudged or moved along by an inclined blade such as shown in FIG. 1, for example.

Figure 2:
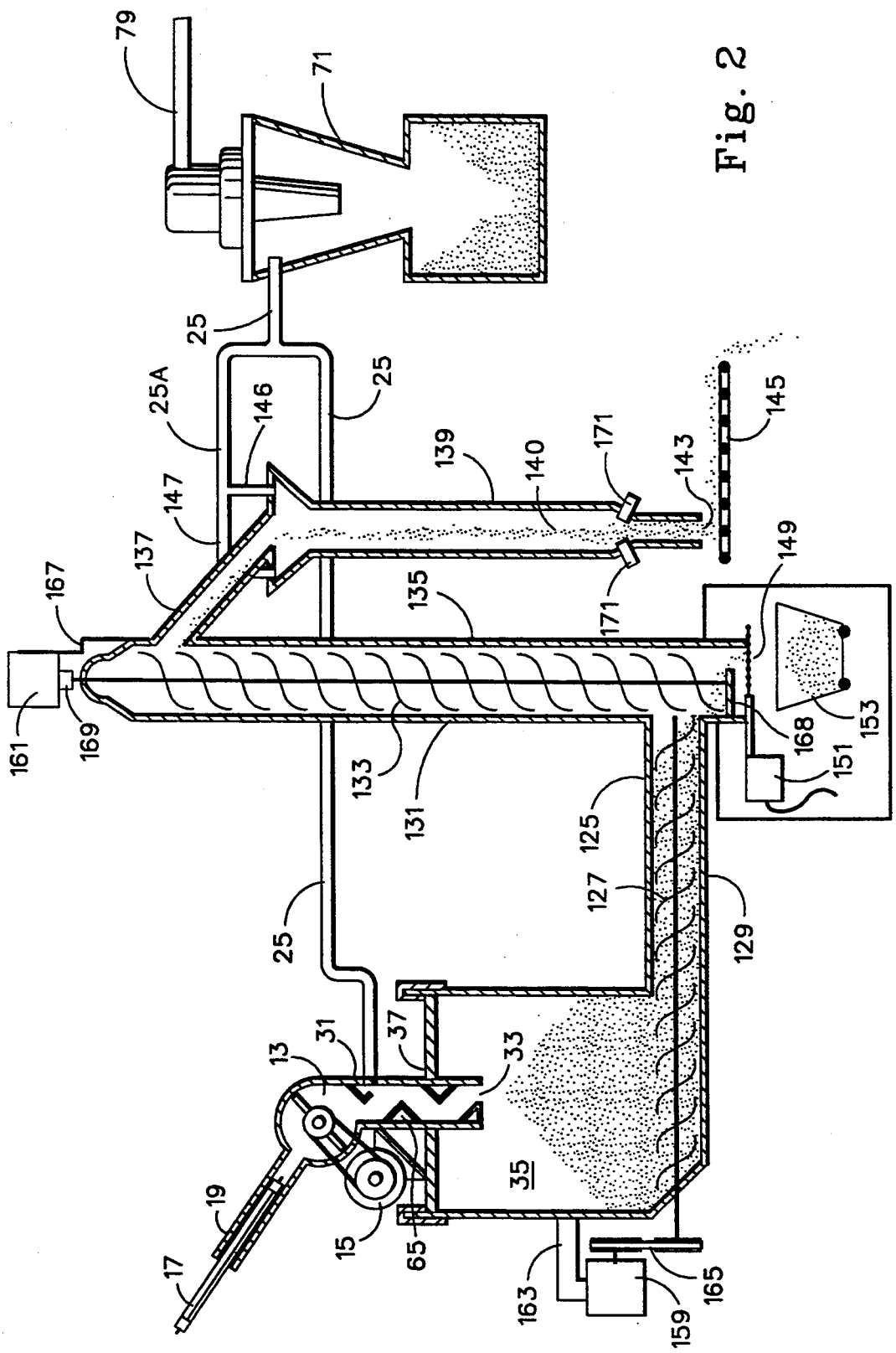
FIG. 2 is a partially broken away diagrammatic view of a second embodiment of the invention also involving use of an auger-type mixing and abrasion auger in combination with a partially shown filtering and absorption arrangement for removing the toxic remainder products from the stripping gas or air stream.

It has been found that the screw conveyor should preferably be inclined at least ten (10) degrees from the horizontal to effect good abrading of the particulates together plus separation of the toxic powder from the glass particulates. However, other angles are also possible. FIG. 2, for example, illustrates a further embodiment of the invention in which, instead of a sloping screw conveyor, there is initially a horizontal screw conveyor separator which leads into a vertical screw conveyor separator which transports both glass particulates substantially straight up and discharges them into a pneumatic countercurrent separation device, where the dislodged toxic powder materials are separated from the glass particulates.

It has also been found to be important that the fractured glass particulates not be further fractured or ground into smaller pieces or sections, since it is an important aim of the apparatus to be able to separate the fractured glass particulates in the form in which they are originally broken from the toxic powder or fluorescent powder materials. Consequently, any grinding of the fractured glass particulates together to the extent that glass particles are removed or ground from their surfaces is undesirable since such small glass particulates may be difficult, if not impossible to remove from the phosphor powder particles. It has been found that the use of an inclined auger apparatus is very effective to provide sufficient contact and pressure between the fractured glass particulates, which are originally fractured into as uniform sized particles as possible in order to effect as good a separation as possible between the fractured glass particulates and the other materials as possible, to abrade their surfaces by intercontact to remove the phosphor powder material, but not to abrade with sufficient pressure or force between the particulates to break or grind pieces of glass from the surfaces of such glass particulates. In other words, it has been found that the amount of force between the particulates can be effectively regulated in an auger running at a restricted speed by relying upon gravitational effects to force the glass particulates together while not causing the individual particulates to fracture further. As indicated above, a ten percent inclination of the auger has been found to be sufficient to provide the requisite gravitational force and the inclination may be increased to as much as a 90 degree inclination with respect to horizontal without increasing the force to a point where it will cause fracture of the particulates. This is at least partially as the result of the fact that the glass particulates are partially supported by the inclined blades of the auger so that an excessive weight of overlying glass particulates is never placed directly upon underlying fractured glass particulates.

In FIG. 2, the same type of initial fracturing chamber 23 and countercurrent separation chamber 31 are shown. In FIG. 2, a fluorescent tube 17 is shown being inserted into the inlet tube 19 leading into the fracture chamber 23 in which a rotatable fracture blade 13 will be understood to strike the fluorescent tube 17 as it slides or progresses down the inlet tube into the fracture chamber and the fractured pieces of glass then fall downwardly through the countercurrent separation chamber 31 through the tortuous passage 68 where the glass particulates strike baffles 65 as in FIG. 1 and a fast-moving stripping gas, usually air, initially strips the majority of the toxic powder particulates originally on the interior of the fluorescent tube from the surface of the fractured glass particulates. The fractured glass particulates fall from the bottom of the countercurrent stripping chamber 31 through an orifice 33 between the walls of the chamber into the bottom of a particulate collection chamber 35, the top of which is closed off as in FIG. 1 with a lid 37. The hopper-type collection chamber 35 is provided at the bottom with an opening or connection to a screw conveyor 125 which transports away the fractured glass particulates and any toxic powder remaining upon the surface of the fractured particulates. The screw conveyor 125, which comprises a helical screw 127 and a housing 129 in which the screw rotates, conveys fractured glass material from the bottom of the hopper 35 to a second vertical screw-type mixing and abrading apparatus 131 comprised of a helical screw 133 which rotates within a housing 135. The horizontal screw conveyor 125 which also acts as a mixing and abrading apparatus has the screw 127 preferably with its outside diameter or O.D. significantly less than the inside diameter or I.D. of the housing 129, to avoid undue wear upon the outer casing as explained in connection with FIG. 1. The I.D. of the housing 135 of the vertical screw mixing and abrading apparatus is also at least somewhat less than the O.D. of the screw conveyor 133 allowing the small particles of toxic powder to work their way in reverse down the conveyor in the clearance between the walls of the housing and the outside of the helical screw, and also to maintain upon the walls, a significant thickness of glass particulates which protect the casing 135 from undue wear. Instead, the fractured glass particulates are carried upwardly and discharged from the top of the screw conveyor through discharge chute 137 which leads into the top of a countercurrent air separation column 139. In column 139, as the fractured glass particulates fall through the column, they are exposed to a rising column of air which is drawn upwardly from the discharge opening 143 and through the countercurrent air separation chamber 140 past descending glass particulates stripping any remaining toxic powder from the surfaces of such glass particulates from which it has been loosened by being thoroughly abraded and forced against surrounding glass particulates as the gravity-compacted particulates are carried up the vertical screw mixing and abrading apparatus 131 as well as during the time the glass particulates are carried through the horizontal screw conveyor 125. The final clean glass particulates after removal by air stripping of the toxic powder are discharged through discharge opening 143 onto belt conveyor 145 which removes such particulates to some collection site, not shown. The air with entrained stripped toxic powder is removed from the top of the stripping column 139 via off-takes 146 which lead into a manifold 147 and out through a take-off conduit 25A which intersects the main take-off pipe 25 just before it discharges into a centrifugal separator 71. The larger toxic dust particles plus some smaller glass particulates, depending upon the separation achieved, are removed. The material not collected in the bottom of the centrifugal separator is removed via the off-take 79 to additional small particulate-removing apparatus such as illustrated, for example, in FIG. 1.

At the lower end of the vertical mixing and abrading device 131 is a finely perforated plate 149 with the perforations only large enough to pass small powder particles as the plate is shaken or agitated by a suitable mechanical shaker 151, such as an intermittently operated pneumatic cylinder or a vibrator of some type. A small transporter 153 is provided to collect the powder discharged from the bottom of the vertical spiral mixing and abrading column 131 and convey it to some other location for disposal or further processing. The spiral blades 127 and 133 are rotated by motors 159 and 161. Motor 159 is supported upon bracket 163 attached to the chamber 35 and operates the screw 127 of the conveyor mixer 125 through a pulley belt or chain drive 165, while the motor 161 is mounted upon a bracket 167 and drives the screw 133 of the conveyor mixer 131 through a suitable gear transmission 169. The lower end of the shaft of the screw 133 is journaled in a sturdy bracket 168.

Air inlets, or suction tuyeres, 171 are provided near the bottom of the countercurrent separation chamber 140 for admission of a countercurrent flow of air through the chamber 140 to the off-takes 146. During operation of the embodiment of the invention shown in FIG. 2, the glass particulates fractured in the fracturing chamber 23 are exposed to a countercurrent flow of air in the countercurrent flow chamber 31 to strip the toxic powder from their surfaces. The fractured glass particulates then fall into the chamber 35 and are removed at the bottom by the horizontal screw conveyor-mixer 125 and delivered to the vertical screw-type mixer and abrader 131 which conveys such particulates vertically and deposits them into discharge chute 137 down which they descend into the countercurrent stripping chamber 140 where toxic powder removed or loosened from the surface of the glass particulates by the action of the mixing and abrading apparatus upon the surfaces of the glass particulates in the two conveyor-mixers 125 and 131 is removed from the vicinity of the glass particulates. The toxic powder is passed out the off-takes 146 to the manifold 147 and from there to the centrifugal separator 71 which may be followed by additional fine particulate removal apparatus as shown in FIG. 1. Additional toxic powder escapes from the bottom of the vertical mixer-conveyor 131 through the fine orifices in the reciprocating serving plate 149. The stripped glass particulates in the meantime pass from the bottom of the countercurrent stripping chamber 140 through the discharge orifice 143 and may be conveyed to a shipping point for shipping to glass recycling plants. Some air may be drawn up the discharge orifice or chute 143, but most of the countercurrent stripping gas or air used in the countercurrent stripping chamber 140 enters the lower sides of the chamber through the air inlets 171. The embodiment of the invention shown in FIG. 2 has the advantage that the vertical conveyor-mixer 131 has a better, more direct gravity separation of the toxic powders from the bottom of the column while the glass particulates are carried to the top.

The vertical screw mixer and abrader also has the advantage that the glass particulates being arranged in a steep column have a considerable weight and gravitational compacting applied to them which causes more intimate contact and abrasion of the surfaces of the glass particulates. In fact, a vertical screw conveyor will usually not operate effectively because the angle of repose of the material being carried is exceeded and the material rather than being carried forward by the revolving blades will merely slip along the blades without attaining any longitudinal movement. However, in the apparatus illustrated in FIG. 2, the presence of the horizontal screw conveyor 125 feeding into the bottom of the vertical mixer and abrader 131 serves to force the fractured glass particulates, which do not compact very tightly in any event, into the bottom of the mixer and abrader and provides the impetus to keep the material moving up the vertical column. Meanwhile, as explained above, the helical blades of the screw conveyor prevent the full weight of the entire overlying column of fractured glass particulates from being exerted upon the lower fractured glass particulates in the column which thus prevents the lower fractured glass particulates from being fractured further into smaller less desirable pieces.

Figure 3:
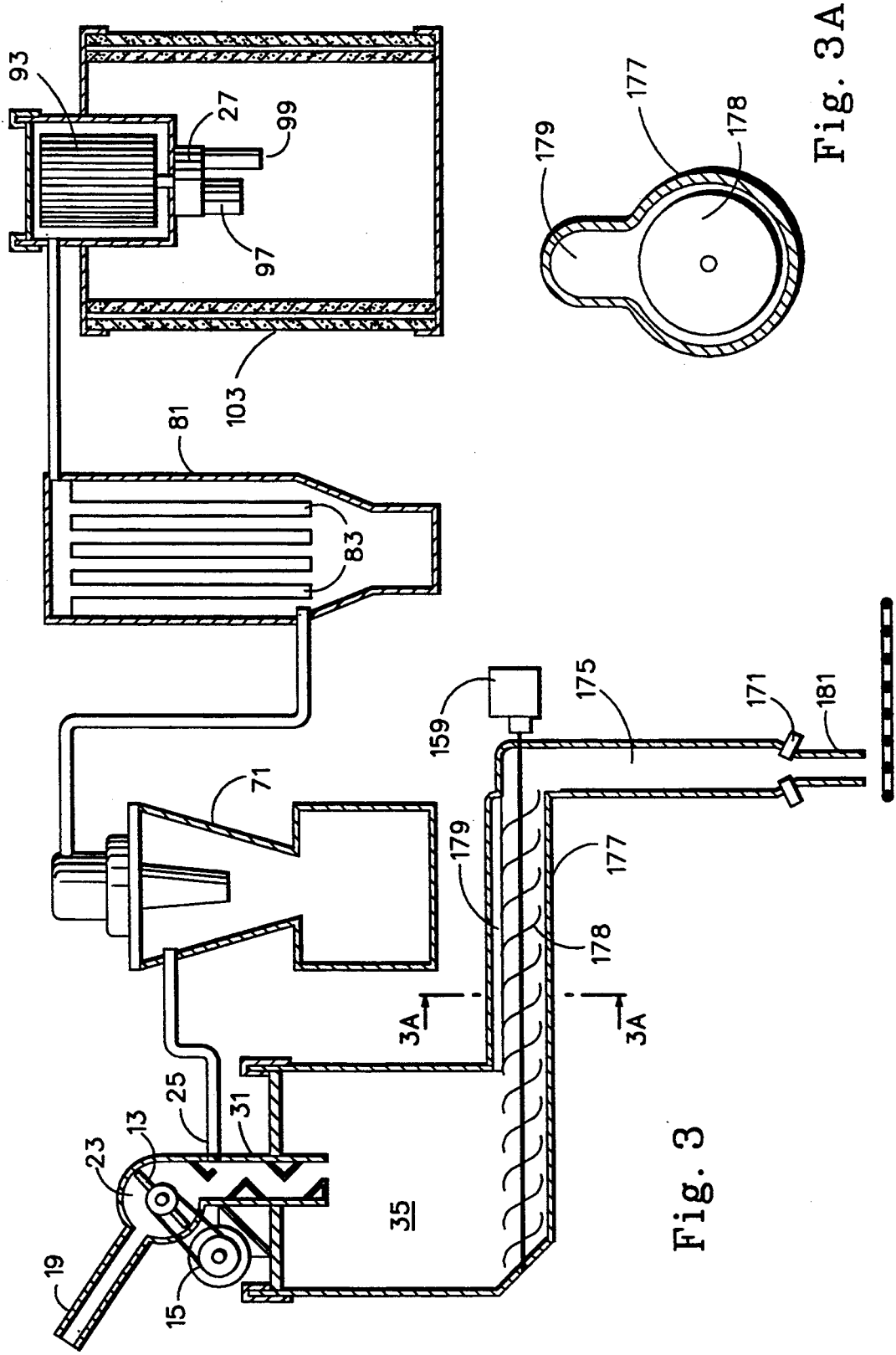
FIG. 3 is a partially broken away diagrammatic view of a further alternative embodiment of the invention using an auger-type mixing and abrasion apparatus in combination with a filtering and absorption apparatus.

FIG. 3 shows a further embodiment of the invention in which the conveyor-mixer and abrader is horizontally oriented and has provision at the top to maintain a continuous flow of stripping gas across the top or along the top of the conveyor, into which gas flow, fine toxic powder particles are entrained. In this way, a continuous stream of stripping air or gas passes from the bottom of a countercurrent stripping chamber 175 up through a screw conveyor 177 partly through the top of the screw conveyor adjacent and between the spiral blades 178 and partly through a connecting passage 179 along the top of the rotating screw chamber. The passage of the air stream across the tops of the helical screw or other blades at the top of such blades causes turbulence and eddies that tend to entrain toxic dust particles that are brought to the surface of the churning mass of glass particulates and separated toxic powder. The stripping air and entrained dust particles then pass up the countercurrent stripping chamber 31 and are passed into the take-off conduit 25 from which the dust particles are removed from the air stream by the same apparatus as shown in FIGS. 1 and 2. The same identification numerals are used in FIGS. 2 and 3 for similar apparatus and with respect to the final stage of removal and filtering as described in FIG. 1. FIG. 3A is a cross section of the screw conveyor mixer 177 showing the connected manifold 179 on the top. The advantage of the apparatus shown in FIGS. 3 and 3A over the apparatus in FIGS. 1 and 2 is the fact that because the screw-type mixer and abrader is horizontally disposed, the glass particulates tend to remain in the lower portion ensuring the passage of stripping air through the helical screw apparatus itself and in fact, from one end of the apparatus to the other beginning at the lower discharge portion 181 of the stripping chamber 175 through the entire apparatus. A disadvantage is that not as great a packing effect due to gravity is present to press the surfaces of the glass particulates together as they move past each other. Consequently, the arrangements shown in FIGS. 1 and 2 are generally preferable where the maximum separation of the toxic powder from the fractured glass particulates is desired.

It will be realized that other arrangements for physically contacting and abrading the surfaces of the glass particulates may also be devised or used. For example, the fractured glass particulates after initial countercurrent gas stripping might be deposited in a fluid solids-type apparatus in which a flow of air suspends a concentrated collection of fractured glass particulates. The fluosolids mass inherently is a churning mass in which the individual particulates are continuously moving about actively impinging upon each other and generally subject to a continuous mild abrading and bumping of the surface of the particulates which is effective to remove a large proportion of any remaining toxic powder from the surfaces of the individual particulates. While the impacts of the particulates together within the fluid solids reactor is somewhat cushioned by the flow of the air between the suspended particles and the abrading together of the glass particulates is thus not as effective in removing adherent toxic powder from the surface of such particulates, the agitation and general level of impaction between particles are fairly high so that a fairly effective level of surface abrasion-type removal of adhering powder can be effected or attained.

Figure 4:
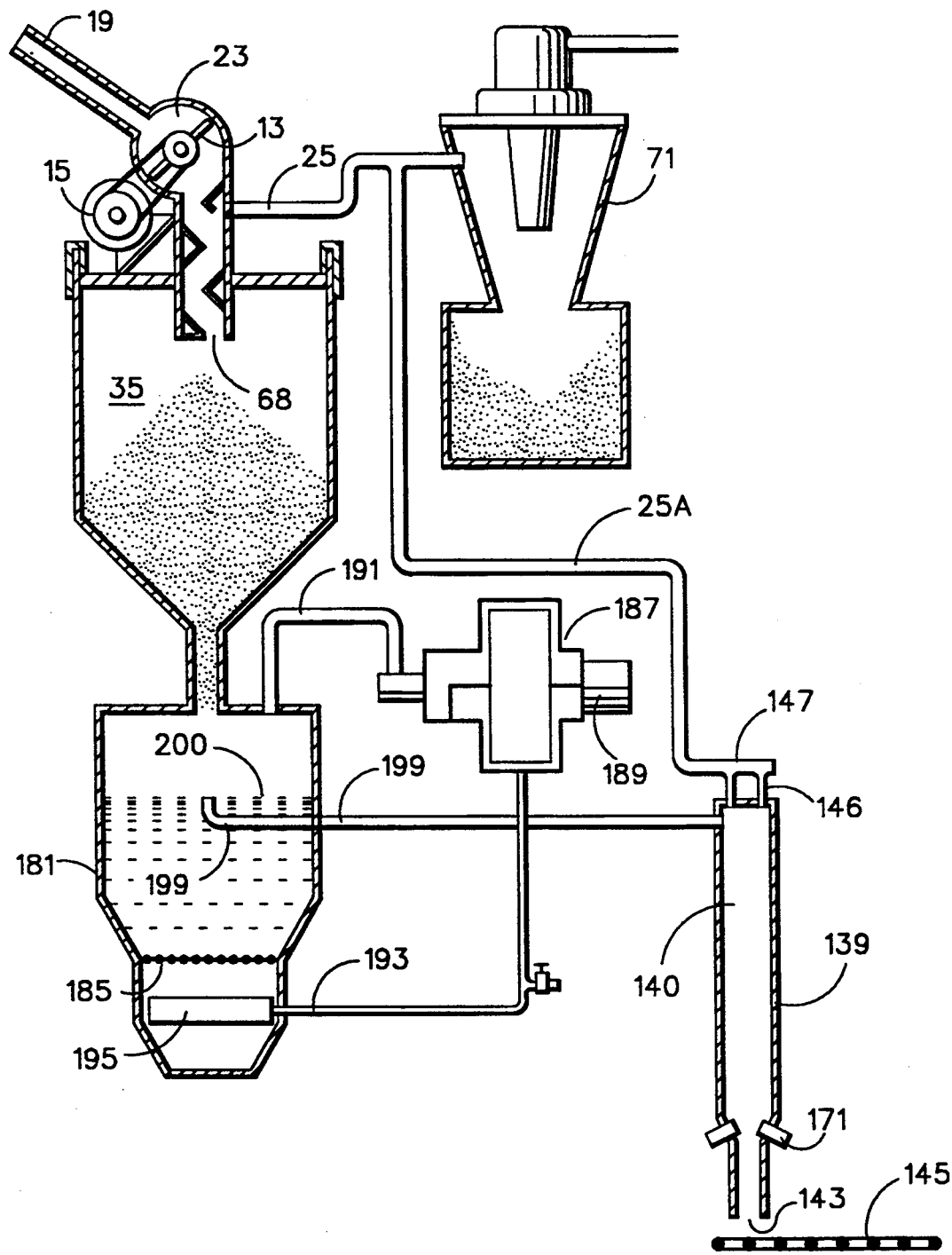
FIG. 4 is a partially broken away diagrammatic illustration of an alternative embodiment of the invention involving the use of a fluosolids-type mixing and abrasion apparatus.

FIG. 4 is a schematic representation of an apparatus arrangement incorporating a fluosolids reactor 181 interconnected to a collection chamber 35 shown in FIGS. 1 and 2 in which is incorporated a fracture chamber 23 and a countercurrent flow stripping chamber 31 generally as already shown in FIGS. 1, 2 and 3.

Fractured glass particulates falling into the bottom of the collection chamber 35 pass into the fluosolids reactor 181 and are suspended in such reactor as a churning mass suspended by a flow of gas through a collection of closely spaced orifices, not shown, in a perforated plate 185 in the bottom of the fluosolids reactor 181. The suspending gas is supplied by a centrifugal pump or blower 187 operated by a motor 189 which draws gas from the top of the fluosolids reactor via outlet conduit 191 and recirculates it again into the fluosolids reactor 181 via inlet conduit 193 and manifold 195. A bleed valve 199 is provided in the offtake conduit 191 to allow atmospheric air to enter the offtake 191, which additional air is then recirculated with the air taken from the top of the fluosolid vessel through the conduit 191 and pump 187 and back into the fluosolids reactor 181. More air is thus passed into the bottom of the fluosolids reactor than is withdrawn from the reactor through the conduit 191 at the top. A good part of the excess gas flow passes up the interconnection of the fluosolids reactor 181 with the collection chamber 35 countercurrent with the descending glass particulates and is finally exhausted via conduit 25 into a centrifugal separator 71 similar to the centrifugal separator 71 shown in the previous figures. The remainder of the excess gas or air passes from the fluosolids vessel through a second discharge conduit 199 leading from the side of the fluosolids reactor below the level or surface 200 of the churning fluosolids mass so that a continuous flow of a representative portion of the churning mass is transported to a countercurrent stripping chamber 140 where such material is injected into the top of the countercurrent flow chamber or column 139 and falls through the column to the bottom meanwhile being stripped of toxic dust by upward passage of air in the column from inlets 171. The glass particulates pass out of the bottom 143 of the countercurrent flow stripping chamber 140 onto a conveyor 145 as in FIGS. 2 and 3 and the stripping gas exits from the stripping column 139 through offtakes 146 and manifold 147 to the centrifugal separator 71 as in the earlier figures.

While it will be found that some small amount of toxic powder will pass into the conduit 191 and be transported about the loop back into the fluosolids reactor 181, the amount is slight and does not plug up the conduits on the centrifugal pump 187. Meanwhile, the steady withdrawal of a certain percentage of the light toxic powder into the collection chamber 35 and out the discharge conduit 25 to the centrifugal separator 71 plus the withdrawal of both free toxic powder and fractured glass particulates stripped of their formerly adhering toxic powder is sufficient to maintain the system in balance.

FIG. 5 is a diagrammatic partially broken away view of a still further embodiment of the invention in which a rotating cylindrical mixer and abrader is substituted for the rotating auger-type mixer and abraders shown in FIGS. 1, 2 and 3. In FIG. 5, a fracture chamber 23 has journaled therein a rotating fracture blade 13 which strikes fluorescent tubes, not shown, passing down a feed tube 19. The fractured glass after being struck by the rotating blade, strikes consecutively the top surface of a series of impact baffles 65 disposed in a countercurrent flow stripping chamber 31 having an effectively tortuous passage 68 passing down through the center and ending in a collection chamber 35 upon the bottom of which fractured glass particulates build up. A grizzly or screen 201 is mounted just past the last impact baffle 65 and extending across the tortuous passage 68 in position to divert to the side and to the outside of the apparatus the metal tips of electrical-type of fluorescent tubes, which tips 203 pass through a constricted opening 205 in the side of the bottom of the countercurrent flow chamber 31 and fall into receptacle 209 on the outside. The opening 205 may be closed by any suitable curtain or trap door, not shown, between passage of the tips through opening 205 in the wall of the chamber 31. Fractured glass particulates, being smaller than the tips, fall or pass through the bars of the grizzly or the mesh of the screen provided across the passage 68 and continue into the bottom of the collection chamber 35 where it piles up on the bottom.

After a certain amount of particulates are collected in the bottom of the collection chamber 35, the top of the collected mound spills into the lower end of a rotating cylindrical tube 209. A series of inclined blades 211 are arranged on the inside to carry the fractured glass particulates upwardly progressively through the cylindrical tube 209. The blades or baffles 211 may preferably be helical blades about the interior of the rotating cylinder 209, but it will be understood by those conversant with such things that other arrangements of baffles or blades can also be used. In FIG. 5, the blades are for convenience merely shown diagrammatically to represent any effective blade.

As the cylinder 209 rotates, the baffles or blades 211 pass continuously around the inside circumference of the rotating tubular mixer and abrader 209. The toxic fractured glass particulates are carried upwardly upon the sides of the cylinder with the rotation of the cylinder and when they have progressed sufficiently far to no longer be supported by the side of the cylinder fall from the side together with any loose toxic powder already detached from the surfaces of the glass particulates showering down from the inverted side onto the bottom of the cylinder. A countercurrent flow of stripping air is meantime passing continuously through the rotating cylinder 209 and this current of air entrains the toxic powder particulates and carries them downwardly into the collection chamber 35 and then upwardly through the tortuous passage 68 until they are carried from such passage into the conduit 25 which leads to a filtering and absorption arrangement such as shown in previous figures.

The rotating cylindrical mixer and abrader 209 operates or rotates on a series of rotating support wheels 213 journaled in an outer gas tight housing or chamber 215 which is a continuation of the collection chamber 35. At the top of the chamber 215 such chamber is in turn converted to or merges with a downturned countercurrent flow chamber 217 which extends downwardly toward a glass particulate receiver 219 of any suitable type either portable or permanent. The support wheels 213 extend through the side walls of the chamber 215 and are mounted upon a long shaft 221 provided outside the chamber 215. A motor 223 is connected to the shaft 221 and any suitable transmission, not shown, and serves to rotate the cylinder 209.

The countercurrent stripping air which passes through the entire apparatus enters the chamber 217 through a constricted lower end 227, passes up through the countercurrent stripping chamber 217 and then enters the top end of the rotating mixing and abrading cylinder 209. The countercurrent stripping air passes downwardly through the rotating cylinder picking up toxic powder particles as it progresses and as such powder and fractured glass particulates fall a short distance from the sides of the cylinder insufficient to fracture such glass, but exposing the powder jarred and abraded from the surface of the glass particulates to the countercurrent flow of air. The countercurrent flow of air is prevented from passing over the outside of the rotating tube 209 between the outside of the tube and the inside of the chamber 215 by a curtain or shroud 229 of any suitable material completely surrounding the rotating tube at an intermediate position along the tube 209.

The advantage of the embodiment of the invention shown in FIG. 5 is the active passage through the center of the mixing and abrading apparatus plus the actual continuous periodic dropping of the glass particulates plus toxic powder particles through said countercurrent flow of air from one circumferential portion of the inside circumference of the tube to another. Excellent periodic exposure of every particulate and dust particle to the countercurrent air flow is in this manner obtained. There is also good surface-to-surface contact of the fractured glass particulates and also jarring impact when they fall form one section of the tube to another. The amount of fall can be adjusted to some extent by how rapidly the cylinder is rotated, it being important that insufficient impact be imparted to further fracture the glass particulates, but sufficient be imparted to jar and shake the glass particulates to remove surface powder contamination. The considerations for impact are thus somewhat similar to the same considerations in the countercurrent flow chamber 31 where the impact of the glass particulates with the impact baffles 65 should be sufficient to jar loose toxic powder, but not sufficient to fracture into smaller pieces the already fractured glass particulates. In both cases, such impact is adjusted by the angle of the surface onto which the glass particulates fall plus the distance they fall. However, in the case of the rotating cylinder arrangement, the added factor that the particulates tend to fall onto a lower deposit of fractured glass particulates has to be taken into consideration.

While the rotary cylinder mixer and abrader of FIG. 5 has been illustrated as a rotary cylinder arranged at an angle and having blades which urge the particulate materials upwardly through such rotating tube and which rotating tube is contained within a further outer housing which serves as the gas tight housing to contain the toxic components that may become entrained in the air flow, other arrangements are also possible. For example, the rotating cylinder could be arranged in the form of a rotary cool kiln-type vessel in which the progress of the material through the kiln is usually due to gravity in a downwardly inclined apparatus. Baffles may still be arranged within the rotating cylinder to lift the materials farther up the side or even to either aid or retard passage along the interior of the cylinder, but the primary mechanism of passage long the kiln will be due to gravitational effects. The rotating cylinder may also be arranged to be substantially horizontal and the materials may be moved through by baffle means particularly of a helical configuration about the inside circumference of the rotating cylinder. Furthermore, the rotary cylinder may itself constitute the outside or casing of the apparatus. In such case, however, some type of seal between the rotating portion of the apparatus and the other stationary portions must be provided.

FIG. 6 is a diagrammatic partially broken away side view of a still further embodiment of the invention involving the use of a closed upwardly inclined chamber similar or even substantially identical to the chamber 215 of FIG. 5 shown connected at one end to the same collection chamber 35 and at the other end to the same countercurrent stripping chamber 217. Within the inclined chamber 215 there is provided a chain or belt-type apparatus 231 mounted for endless rotation upon two opposed sprocket or other wheels 233 and 235 and carrying a series of traveling rakes or baffles 237 which serve to drag a layer of particulate material up the incline along the surface of a deposit of such particulate material. Such dragging causes a continuous mixing, stirring, overturning and abrading of the surfaces of the particulates by adjacent particulates as well as to some extent at least by the surfaces of the rakes themselves.

As glass particulate material reaches the top of the chamber 215 it falls through an opening 239 into a countercurrent stripping chamber 217 as in FIG. 5 and falls through an upwardly flowing air stream into the receptacle 220. The countercurrent stripping chamber 217 receives air into circumferential orifice 241 between a circular shroud 243 about the restricted diameter countercurrent stripping chamber which shroud extends over the orifice into the receptacle 220, which receptacle may be preferably, but not necessarily, a portable carrier for the final clear glass particulates. Air thus passes between the shroud 243 and the top 220A of the receptacle 220 through the circumferential opening 241 into the receptacle and is immediately drawn up the countercurrent stripping chamber 217. An air outlet 247 is also preferably provided at the top of the countercurrent stripping chamber 217 which leads to the same vacuum-type filtering and absorbing system as shown in previous figures. Additional air passes through the opening 239 into the chamber 215 and progresses through chamber 215 to the countercurrent stripping chamber 31 and out the conduit 25 which also leads to the filtering and absorbing system, not shown. Additional toxic powder is picked up in the chamber 215 as the glass particulates are stirred by the rakes 237. However, because of the volume of the chamber 215 and the nature of the raking within it, there is less pickup of toxic powder within the chamber 215 in FIG. 6 than is had in the apparatus of FIG. 5. This is the principal reason why there is provided an additional vacuum exit 247 in order to provide a very strong air stripping in the countercurrent stripping chamber 217. The shroud-type opening 241 at the top of the receptacle 207 has been found in operation to be particularly effective and convenient and can be used in other embodiments of the apparatus as well.

Figure 7:
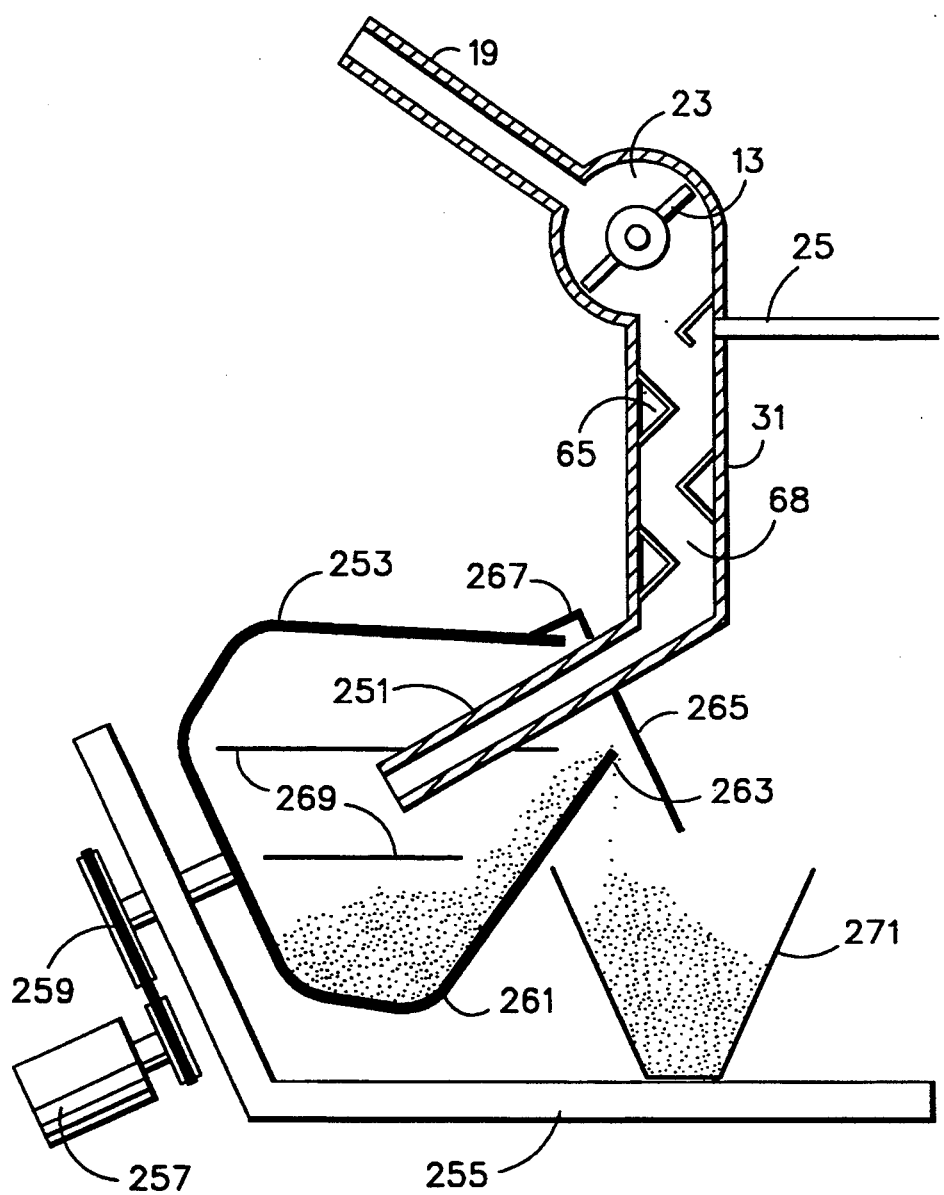
FIG. 7 is a partially broken away diagrammatic illustration of a relatively simple and basic but still effective apparatus and arrangement for practicing the invention involving use of a simple rotary mixer-type mixing and abrading apparatus.

FIG. 7 is a diagrammatic partially broken away illustration of a rather simple basic apparatus for practicing the mixing and abrading portion of the invention in which the fractured glass particulates, after passing through the initial countercurrent flow chamber having the preferred jarring baffles, are then deposited into a rotating mixer and abrader similar in operation to an ordinary cement mixer and agitated to abrade the surface of the particulates against each other to remove the toxic powder adhering to such surfaces. The continuous rotation of the rotary mixer and abrader plus dropping of the particulates through the vessel space where the small toxic powder particles may be entrained in the air entering the mixer about the lip thereof and drawn off through the countercurrent stripping chamber results in a separation of the toxic powder. The remaining fractured glass particulates in the meantime are passed over the lip of the rotating mixer and abrader and into a receptacle. The overturning and dropping of the materials in mixer causes a fairly good separation between the fractured glass particulates and the toxic powder, so that a subsequent countercurrent air stripping may not always be necessary. However, the discharge from the mixer may also be subjected to a countercurrent air stripping to increase the cleanliness of the fractured glass particulates. The additional countercurrent air separation step can be added as an integral further step or can be added as a separate step in which the fractured glass particulates discharged from the mixer and abrader can be transported in any convenient manner to a hopper into which they are deposited and fed at a predetermined rate through a countercurrent air stripping apparatus.

More specifically, in FIG. 7 there is provided, as in previous figures, a fracture chamber 23 in which a rotating fracture blade 13 rotates. Below this is a countercurrent flow stripping chamber 31 with the usual impact baffles 65 upon the top surfaces of which the fractured glass particulates impact. A long snout 251 extends from the bottom of the countercurrent flow stripping chamber into the center of a rotary mixer and abrading vessel 253 which is rotatably journaled at an angle in a supporting base 255 and operated by a motor 257 through a chain and gear or sprocket drive 259. The vessel 253 has bulbous sides 261 so that a fair body of material may be accommodated in the bottom or effective side and will, as more material is added, overflow over the lip 263 between such lip and a cover 265. Except at the bottom, the cover 265 has a flange 267 around the edge which fits loosely over the lip of the vessel, but allows the ingress of air all around the sides of the lip of the vessel so there is a continuous passage of air into the mixer-abrader and ultimately into the long snout 251 from which it is exhausted into the countercurrent flow stripping chamber 31 and ultimately withdrawn to the vacuum system, not shown, through the off-take conduit 25. The rotary vessel 253 has vanes or baffles 269 within it which lift and mix the fractured glass particulates to increase the mixing and abrading action of the rotating vessel. Fractured glass particulates overflow over the lip 263 and fall into a collection container 271 of any suitable type.

As indicated above, although no secondary or final countercurrent stripping chamber is shown in FIG. 7, since only a very basic system is shown which accomplishes considerable entrainment of toxic powder within the vessel itself and thus effects a rather clean separation of the fractured glass particulates and the toxic powder without further countercurrent stripping, such a final countercurrent stripping stage may be desirably added to the process and apparatus, either as an integral portion of the overall apparatus, in which case the material from the mixer would overflow directly into the countercurrent flow chamber, or in which the overflow material would be transported to such further operation either integrally or as a separate or further step. It has not been thought necessary to show either such integral or independent countercurrent stripping apparatus since it would be substantially as shown in previous figures.

As will be recognized, the present invention carefully balances a number of factors in order to attain an economical and efficient system. In accordance with the invention, a flow of air is established through the fracturing and countercurrent flow sections of the apparatus which is sufficient to effectively strip the phosphor from the broken or fractured glass. This requires a careful balancing of all factors, including the gas passage over the baffles of the invention whereby the air flow through the noted chamber is sufficient to strip the phosphor material from the glass surfaces and prevent escape of phosphor or mercury-laden air, combined with a filtering system that is efficient and stable over long periods between cleaning of the filters while removing substantially all powders and other materials from the air stream, all as more particularly described above and in the concurrently filed application referred to. After the countercurrent stripping is completed, in combination with baffle jarring or not, the fractured glass precipitates are then passed to a mixing and abrading apparatus which further abrades the surfaces of the glass particulates. This further mixing and abrading further detaches toxic powder from the surface of the fractured glass particulates. This further mixing and abrading further detaches toxic powder from the surface of the fractured glass particulates. The residual material is then preferably passed through a second countercurrent gas stripping operation, although, as explained above, in some arrangements the countercurrent air stripping may be combinable with the mixing and abrading operation and a separate operation may be eliminated, although it is in general advantages to include such step as a final precaution at least.

It should be understood that although the present invention has been described at some length and in considerable detail and with some particularity with regard to several embodiments in connection with the accompanying figures and description, all such description and showing is to be considered as illustrative only and the invention is not intended to be narrowly interpreted in connection therewith or limited to any such particulars or embodiments, but should be interpreted broadly within the scope of the delineation of the invention set forth in the accompanying claims thereby to effectively encompass the intended scope of the invention.

I claim:

1. A method of separating small, potentially toxic particles from fractured glass particulates derived from crushing of fluorescent light tubes comprising:
   (a) passing the fractured glass particulates having phosphor and other particles clinging to their surface into a particulate mixing-type device,
   (b) operating such mixing-type device to subject such glass particulates to substantial movement over a given period with respect to each other and in at least partial surface contact with each other to an extent such that a substantial portion of the particles adhering to the surface of the glass particulates are detached from said particulates,
   (c) removing the phosphor and other particles from the vicinity of the fractured glass particulates by means of a stream of gas passing through at least a portion of the fractured glass particulates at a given time,
   (d) the stream of gas being passed through at least a portion of the fractured glass particulates being applied subsequent to subjection of such particulates to substantial movement with respect to and in contact with each other,
   (e) the glass particulates being directed countercurrently with respect to the gas stream to strip the particles from the particulates.

2. A method of separating small, potentially toxic particles from fractured glass particulates in accordance with claim 1 wherein the stream of gas conveys the potentially toxic particles to a subsequent gas clarification means where the particles are removed from the gas.

3. A method of separating small, potentially toxic particles from fractured glass particulates in accordance with claim 2 wherein the glass particulates are subjected to substantial movement with respect to and in contact with each other in a screw or auger-type mixing device which conveys the glass particulates from one operative end to the other of the auger while mixing them and depositing them into a countercurrent gas stripping chamber where they are subjected to a gas stripping operation.

4. A method of separating small, potentially toxic particles from fractured glass particulates in accordance with claim 2 wherein the glass particulates are subjected to substantial movement with respect to and in contact with each other upon the inner surface of a rotating mixer through which an air stream is passed to entrain small particles.

5. A method for separating toxic dust particles from fractured glass particulates derived from the fracturing of fluorescent light tubes comprising:
   (a) directing the fractured glass particulates into an agitation device in which the particulates are continuously actively impinged upon each other without substantial further fracturing whereby powder-type material adhering to the surface of the glass particulates is removed from such surface;
   (b) directing the glass particulates and powder material into a countercurrent stripping arrangement whereby the powder and glass are separated from each other by a stream of stripping gas passing countercurrently to said particulates at a flow rate adapted to entrain the powder and carry it away countercurrent to the passage of said particulates which fall under the influence of gravity through such gas.

6. A method of separating dust particulates from fractured glass particulates in accordance with claim 5 wherein such particulates are continuously actively impinged upon each other by passing them progressively through a rotating helical screw conveyor which moves the particulates in a predetermined direction through the screw conveyor by rotation of a helical blade while rubbing the surfaces of the fractured glass particulates against each other as they pass through such helical screw conveyor rubbing and abrading powder-type material from their surfaces.

7. A method of separating dust particles from fractured glass particulates in accordance with claim 6 wherein the particulates are passed through a helical screw conveyor inclined at an acute angle from horizontal to effect a desirable packing together of the fractured glass particulates as they are moved through the helical screw conveyor.

8. A method of separating dust particulates from fractured glass particulates in accordance with claim 6 wherein the particulates are passed through a screw conveyor which is disposed substantially horizontal in disposition minimizing back pressure in the screw conveyor by minimizing the height of particulates supported upon other particulates.

9. A method of separating dust particulates from fractured glass particulates in accordance with claim 8 wherein at least some stripping air is passed through the top of the screw conveyor above the level of the moving glass particulates to entrain dust particles released from particulates passing through the screw conveyor.

10. A method of separating small, potentially toxic particles from fractured glass particulates derived from crushing of fluorescent light tubes comprising:
(a) passing the fractured glass particulates having phosphor and other particles clinging to their surface into a particulate mixing-type device,
(b) operating such mixing-type device to subject such glass particulates to substantial movement over a given period with respect to each other and in at least partial surface contact with each other to an extent such that a substantial portion of the particles adhering to the surface of the glass particulates are detached from said particulates,
(c) removing the phosphor and other particles from the vicinity of the fractured glass particulates by means of a stream of gas passing through at least a portion of the fractured glass particulates at a given time,
(d) the stream of gas being passed through at least a portion of the fractured glass particulates subsequent to subjection of such particulates to substantial movement with respect to and in contact with each other and wherein the stream of gas conveys the potentially toxic particles to a subsequent gas clarification means where the particles are removed from the gas, and
(e) wherein the glass particulates are subjected to substantial movement with respect to and in contact with each other in a screw or auger-type mixing device which conveys the glass particulates from one operative end to the other of the auger while mixing them and depositing them into a countercurrent gas stripping chamber where they are subjected to a gas stripping operation.

11. A method of separating small, potentially toxic particles from fractured glass particulates derived from crushing of fluorescent light tubes comprising:
(a) passing the fractured glass particulates having phosphor and other particles clinging to their surface into a particulate mixing-type device,
(b) operating such mixing-type device to subject such glass particulates to substantial movement over a given period with respect to each other and in at least partial surface contact with each other to an extent such that a substantial portion of the particles adhering to the surface of the glass particulates are detached from said particulates,
(c) removing the phosphor and other particles from the vicinity of the fractured glass particulates by means of a stream of gas passing through at least a portion of the fractured glass particulates at a given time,
(d) the stream of gas being passed through at least a portion of the fractured glass particulates subsequent to subjection of such particulates to substantial movement with respect to and in contact with each other and wherein the stream of gas conveys the potentially toxic particles to a subsequent gas clarification means where the particles are removed from the gas, and
(e) wherein the glass particulates are subjected to substantial movement with respect to and in contact with each other upon the inner surface of a rotating mixer through which an air stream is passed to entrain small particles.

12. A digester for used fluorescent tubes for decreasing bulk of the glass components of such tubes and allowing use of the component glass for recycling while collecting toxic dust fumes for separate safe disposal comprising:
(a) a fracture chamber incorporating a rotatable chopping blade,
(b) a countercurrent flow chamber adjoining and interconnected with the bottom of the fracture chamber,
(c) a gas take-off in the vicinity of the interconnection of the countercurrent flow chamber and the fracture chamber for drawing stripping gas from said fracture and countercurrent flow chambers,
(d) a fractured glass particulate collection chamber attached to the lower portion of the countercurrent flow chamber,
(e) a means for mixing fractured glass particulates received in said collection chamber such that said glass particulates are moved past each other while in surface-to-surface contact,
(f) means for passing a flow of stripping gas through the mixed glass particulates to strip out toxic dust, and
(g) means for receiving the stripping gas from the fracture and countercurrent stripping chambers and the stripping gas passing through the mixed glass particulates and removing toxic dust particles from said stripping gas.

13. A digester for used fluorescent tubes in accordance with claim 12 additionally comprising baffle means in the countercurrent flow chamber to jar the glass particulates.

14. A digester for used fluorescent tubes in accordance with claim 13 wherein the means for passing stripping gas through the mixed glass particulates is arranged and constructed for passing such stripping gas through the means for mixing the fractured glass with surface-to-surface contact.

15. A digester for used fluorescent tubes in accordance with claim 13 wherein there is a separate countercurrent flow chamber through which the mixed glass particulates are directed countercurrent with a stripping gas.

16. A method of digesting used fluorescent light tubes inclusive of separating fractured glass from small toxic particles adhered to said fractured glass particulates comprising:
(a) passing a fluorescent tube into a fracture chamber where it is struck by rotating fracture blades and broken into fractured glass particulates,
(b) passing the fractured glass particulates through a countercurrent gas stripping chamber countercurrent with a stream of striping gas,
(c) passing the fractured glass particulates into a mixing apparatus and thoroughly mixing in a manner such that the surfaces of the fractured glass particulates are exposed to contact with adjacent particulates resulting in an abrading action between such particulates which removes toxic powder from the surfaces thereof, and (d) exposing the thoroughly mixed glass particulates to a stripping gas and passing such stripping gas to a particle removed apparatus.

17. A method of digesting used fluorescent light tubes in accordance with claim 16 additionally comprising:
    (e) jarring the glass particulates by directing them against slanted baffle means within a countercurrent flow chamber.

18. A method of digesting used fluorescent light tubes in accordance with claim 17 wherein exposure of the particulates to a stripping gas is conducted subsequent to mixing the glass particulates and is carried out largely in separate countercurrent stripping and mixing chambers.

19. An apparatus for separating toxic powder from fractured glass particulates upon at least one surface of which said powder may be found, comprising:
    (a) a means for continuously moving glass particulates with respect to other of glass particulates and in contact therewith sufficiently to dislodge adhered toxic powder from the surface of said particulates by impact and rubbing between the particulates,
    (b) second means to countercurrently separate the toxic powder from such glass particulates by directing a gas past the previously impacted glass particulates to strip said toxic powder from their surfaces.

20. An apparatus for separating toxic powder from fractured glass particulates in accordance with claim 19 wherein the means for effecting continuous impacting and rubbing of particulates with each other comprises a rotatable screw conveyor.

21. An apparatus for separating toxic powder in accordance with claim 20 wherein the rotatable screw conveyor comprises an inclined rotatable screw conveyor inclined at an angle of more than ten degrees from horizontal.

22. An apparatus for separating small, potentially toxic particles from fractured glass particulates derived from crushing of fluorescent light tubes comprising:
    (a) a first mixing means arranged and constructed for initially mixing together fractured glass particulates having phosphor and other particles clinging to their surfaces with substantial movement over a period between the particulates and with at least partial surface contact between the fractured particulates to an extent such that a substantial portion of the phosphor and other particles adhering to the surface of the glass particulates are separated from such particulates, and
    (b) a second stripping means for subsequently passing a stream of stripping gas through the fractured glass particulates to strip phosphor and other particles from said glass particulates, and
    (c) a third means for passing said stream of stripping gas and removed particles to a means for removing said particles from the gas stream by a particle removing apparatus.

23. An apparatus for separating small particles from fractured glass particulates in accordance with claim 22 wherein the first mixing means is a rotating hollow mixer which lifts the glass particulates upon the sides of the mixer and drops such particulates a short distance through a stripping gas passing through the interior of the rotating mixer.

24. An apparatus for separating small particles from fractured glass particulates in accordance with claim 22 wherein the means for passing a stream of stripping gas through the gas particulates comprises a countercurrent gas stripping chamber arranged subsequent, from an operational sequence, to the first mixing means.

25. An apparatus for separating small particles from fractured glass particulates in accordance with claim 24 wherein the mixing means is an extended screw-type mixer which differentially moves the glass particulates with respect to and in contact with each other and transfers them to the countercurrent gas stripping chamber.

26. An apparatus for separating small particles from fractured glass particulates in accordance with claim 25 where the screw-type mixer is positioned at an angle of at least ten degrees from horizontal.

27. An apparatus for separating small particles from fractured glass particulates in accordance with claim 25 wherein the screw separator is divided into a substantially horizontal and substantially vertical sections.

28. An apparatus for separating small particles from fractured glass particulates in accordance with claim 24 wherein the mixer comprises a plurality of rakes arranged and constructed for passage through the fractured glass particulates and urging them up an incline.

* * * * *